(12) United States Patent
Harley et al.

(10) Patent No.: US 10,386,970 B2
(45) Date of Patent: Aug. 20, 2019

(54) FORCE DETERMINATION BASED ON CAPACITIVE SENSING

(71) Applicant: Apple Inc., Cupertino, CA (US)

(72) Inventors: Jonah A. Harley, Cupertino, CA (US); Peter W. Richards, San Francisco, CA (US); Brian Q. Huppi, Cupertino, CA (US); Omar Sze Leung, Palo Alto, CA (US); Dhaval N. Shah, Cupertino, CA (US); Martin P. Grunthaner, Cupertino, CA (US); Steven P. Hotelling, Cupertino, CA (US); Miguel C Christophy, Cupertino, CA (US); Vivek Katiyar, Cupertino, CA (US); Tang Yew Tan, Cupertino, CA (US); Christopher J. Butler, Cupertino, CA (US); Erik G. de Jong, Cupertino, CA (US); Ming Sartee, Morro Bay, CA (US); Rui Qiao, Cupertino, CA (US); Steven J. Martisauskas, Cupertino, CA (US); Storrs T. Hoen, Cupertino, CA (US); Richard Hung Minh Dinh, Cupertino, CA (US); Lee E. Hooton, Cupertino, CA (US); Ian A. Spraggs, Cupertino, CA (US); Sawyer I. Cohen, Cupertino, CA (US); David A. Pakula, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 14/766,639

(22) PCT Filed: Feb. 6, 2014

(86) PCT No.: PCT/US2014/015157
§ 371 (c)(1),
(2) Date: Aug. 7, 2015

(87) PCT Pub. No.: WO2014/124173
PCT Pub. Date: Aug. 14, 2014

(65) Prior Publication Data
US 2015/0370376 A1  Dec. 24, 2015

Related U.S. Application Data

(60) Provisional application No. 61/762,843, filed on Feb. 8, 2013, provisional application No. 61/883,181, filed on Sep. 26, 2013.

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04105* (2013.01)

(58) Field of Classification Search
CPC .................. G06F 3/044; G06F 3/0414; G06F 2203/04105
See application file for complete search history.

(56) References Cited

U.S. PATENT DOCUMENTS

| 4,527,862 A | 7/1985 | Arakawa |
| 5,343,064 A | 8/1994 | Spangler et al. |

(Continued)

FOREIGN PATENT DOCUMENTS

| CN | 1378169 | 11/2002 |
| CN | 1502166 | 6/2004 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Temesghen Ghebretinsae

*Assistant Examiner* — Ivelisse Martinez Quiles
(74) *Attorney, Agent, or Firm* — Brownstein Hyatt Farber Schreck, LLP

(57) ABSTRACT

A device configured to determine the location and magnitude of a touch on a surface of the device. The device includes a transparent touch sensor that is configured to detect a location of a touch on the transparent touch sensor. The device also includes a force-sensing structure disposed at the periphery of the transparent touch sensor. The force sensor includes an upper capacitive plate and a compressible element disposed on one side of the upper capacitive plate. The force sensor also includes a lower capacitive plate disposed on a side of the compressible element that is opposite the upper capacitive plate.

15 Claims, 16 Drawing Sheets

(56) References Cited

U.S. PATENT DOCUMENTS

| | | |
|---|---|---|
| 5,929,517 A | 7/1999 | Distefano et al. |
| 6,002,389 A | 12/1999 | Kasser |
| 6,079,282 A | 6/2000 | Lanter |
| 6,154,580 A | 11/2000 | Kuriyama et al. |
| 6,323,846 B1 | 11/2001 | Westerman et al. |
| 6,545,495 B2 | 4/2003 | Warmack et al. |
| 6,568,275 B2 | 5/2003 | Scholz et al. |
| 6,570,557 B1 | 5/2003 | Westerman et al. |
| 6,570,707 B1 | 5/2003 | Murakami |
| 6,676,611 B1 | 1/2004 | Bromba |
| 6,677,932 B1 | 1/2004 | Westerman |
| 6,781,576 B2 | 8/2004 | Tamura |
| 6,933,031 B2 | 8/2005 | Ohta et al. |
| 6,989,728 B2 | 1/2006 | Van Zeeland et al. |
| 7,158,122 B2 | 1/2007 | Roberts |
| 7,211,885 B2 | 5/2007 | Nordal et al. |
| 7,337,085 B2 | 2/2008 | Soss |
| 7,409,876 B2 | 8/2008 | Ganapathi et al. |
| 7,511,702 B2 | 3/2009 | Hotelling |
| 7,538,760 B2 | 5/2009 | Hotelling et al. |
| 7,609,178 B2 | 10/2009 | Son et al. |
| 7,719,522 B2 | 5/2010 | Lyon et al. |
| 7,784,366 B2 | 8/2010 | Daverman et al. |
| 7,920,134 B2 | 4/2011 | Krah |
| 7,946,758 B2 | 5/2011 | Mooring |
| 8,072,437 B2 | 12/2011 | Miller et al. |
| 8,169,332 B2 | 5/2012 | Bernstein et al. |
| 8,169,416 B2 | 5/2012 | Han |
| 8,228,306 B2 | 7/2012 | Long |
| 8,253,711 B2 | 8/2012 | Kim et al. |
| 8,274,495 B2 | 9/2012 | Lee |
| 8,289,290 B2 | 10/2012 | Klinghult |
| 8,334,849 B2 | 12/2012 | Murphy et al. |
| 8,351,993 B2 | 1/2013 | Nunes |
| 8,390,481 B2 | 3/2013 | Pance et al. |
| 8,421,978 B2 | 4/2013 | Wang et al. |
| 8,436,823 B2 | 5/2013 | Kanehira et al. |
| 8,525,797 B2 | 9/2013 | Liu et al. |
| 8,547,350 B2 | 10/2013 | Anglin et al. |
| 8,577,289 B2 | 11/2013 | Schlub et al. |
| 8,577,644 B1 | 11/2013 | Ksondzyk et al. |
| 8,633,916 B2 | 1/2014 | Bernstein et al. |
| 8,638,316 B2 | 1/2014 | Badaye et al. |
| 8,669,963 B2 | 3/2014 | Baker et al. |
| 8,704,787 B2 | 4/2014 | Yamamoto et al. |
| 8,711,122 B2 | 4/2014 | Wada et al. |
| 8,724,861 B1 | 5/2014 | Sun |
| 8,730,189 B2 | 5/2014 | Mamba et al. |
| 8,743,083 B2 | 6/2014 | Zanone et al. |
| 8,760,413 B2 | 6/2014 | Peterson et al. |
| 8,780,055 B2 | 7/2014 | Marchand et al. |
| 8,780,062 B2 | 7/2014 | Hibara et al. |
| 8,780,075 B2 | 7/2014 | Yamano et al. |
| 8,805,517 B2 | 8/2014 | Radivojevic et al. |
| 8,810,521 B2 | 8/2014 | Ito |
| 8,830,205 B2 | 9/2014 | Chang et al. |
| 8,913,031 B2 | 12/2014 | Honda et al. |
| 8,922,523 B2 | 12/2014 | Lynch et al. |
| 8,963,874 B2 | 2/2015 | Li et al. |
| 8,970,507 B2 | 3/2015 | Holbein et al. |
| 8,988,364 B2 | 3/2015 | Lee |
| 9,001,080 B2 | 4/2015 | Okayama et al. |
| 9,007,331 B2 | 4/2015 | Sobel et al. |
| 9,024,898 B2 | 5/2015 | Kim et al. |
| 9,024,907 B2 | 5/2015 | Bolender |
| 9,030,440 B2 | 5/2015 | Pope et al. |
| 9,057,653 B2 | 6/2015 | Schediwy et al. |
| 9,086,768 B2 | 7/2015 | Elias et al. |
| 9,088,282 B2 | 7/2015 | Holenarsipur et al. |
| 9,092,129 B2 | 7/2015 | Abdo et al. |
| 9,104,898 B2 | 8/2015 | Case |
| 9,116,569 B2 | 8/2015 | Stacy et al. |
| 9,207,134 B2 | 12/2015 | Ting et al. |
| 9,218,472 B2 | 12/2015 | Alameh et al. |
| 9,229,587 B2 | 1/2016 | Kawaguchi et al. |
| 9,235,645 B1 | 1/2016 | Ishizone et al. |
| 9,262,002 B2 | 2/2016 | Momeyer et al. |
| 9,323,372 B2 | 4/2016 | Kim et al. |
| 9,354,752 B2 | 5/2016 | Kanehira et al. |
| 9,375,874 B2 | 6/2016 | Lin et al. |
| 9,390,308 B2 | 7/2016 | Mankowski et al. |
| 9,411,458 B2 | 8/2016 | Worfolk et al. |
| 9,430,102 B2 | 8/2016 | Prest et al. |
| 9,454,268 B2 | 9/2016 | Badaye et al. |
| 9,477,342 B2 | 10/2016 | Daverman et al. |
| 9,494,473 B2 | 11/2016 | Hanson et al. |
| 9,542,589 B2 | 1/2017 | Thammasouk et al. |
| 9,671,889 B1 | 6/2017 | Miller et al. |
| 9,710,095 B2 | 7/2017 | Hotelling |
| 9,715,301 B2 | 7/2017 | Kuboyama et al. |
| 9,772,245 B2 | 9/2017 | Besling et al. |
| 9,851,828 B2 | 12/2017 | Richards et al. |
| 9,910,529 B2 | 3/2018 | Chang et al. |
| 2005/0005703 A1 | 1/2005 | Saito et al. |
| 2006/0197750 A1* | 9/2006 | Kerr ............... G06F 1/1626 345/173 |
| 2006/0197753 A1 | 9/2006 | Hotelling |
| 2007/0272919 A1 | 11/2007 | Mori et al. |
| 2008/0150901 A1 | 6/2008 | Lowles et al. |
| 2009/0015564 A1 | 1/2009 | Ye et al. |
| 2009/0066345 A1 | 3/2009 | Klauk et al. |
| 2009/0237374 A1 | 9/2009 | Li et al. |
| 2010/0045628 A1 | 2/2010 | Gettemy et al. |
| 2010/0066702 A1* | 3/2010 | Lee ............... G06F 3/044 345/174 |
| 2010/0117989 A1 | 5/2010 | Chang |
| 2010/0123686 A1 | 5/2010 | Klinghult et al. |
| 2010/0220065 A1 | 9/2010 | Ma |
| 2011/0012845 A1 | 1/2011 | Rothkopf et al. |
| 2011/0025631 A1* | 2/2011 | Han ............... G06F 3/0414 345/173 |
| 2011/0037706 A1 | 2/2011 | Pasquero et al. |
| 2011/0080373 A1 | 4/2011 | Wang et al. |
| 2011/0096013 A1 | 4/2011 | Krumpelman et al. |
| 2011/0148811 A1* | 6/2011 | Kanehira ............ G06F 3/044 345/174 |
| 2011/0216016 A1 | 9/2011 | Rosener |
| 2011/0227866 A1 | 9/2011 | Kawaguchi et al. |
| 2011/0227872 A1 | 9/2011 | Huska et al. |
| 2011/0235156 A1 | 9/2011 | Kothari et al. |
| 2012/0038577 A1 | 2/2012 | Brown et al. |
| 2012/0056826 A1 | 3/2012 | Kim et al. |
| 2012/0086669 A1 | 4/2012 | Kim et al. |
| 2012/0089348 A1 | 4/2012 | Perlin et al. |
| 2012/0090757 A1 | 4/2012 | Buchan et al. |
| 2012/0092285 A1 | 4/2012 | Osborn et al. |
| 2012/0098760 A1 | 4/2012 | Chuang |

(56) References Cited

U.S. PATENT DOCUMENTS

| | | | |
|---|---|---|---|
| 2012/0098767 A1* | 4/2012 | Takai | G06F 3/041 345/173 |
| 2012/0104097 A1 | 5/2012 | Moran et al. | |
| 2012/0105358 A1 | 5/2012 | Momeyer et al. | |
| 2012/0169612 A1 | 7/2012 | Alameh et al. | |
| 2012/0188202 A1 | 7/2012 | Tsujino et al. | |
| 2012/0274602 A1 | 11/2012 | Bita et al. | |
| 2012/0313863 A1 | 12/2012 | Hsu | |
| 2012/0319966 A1* | 12/2012 | Reynolds | G06F 3/041 345/173 |
| 2012/0319987 A1 | 12/2012 | Woo | |
| 2013/0076375 A1* | 3/2013 | Hanumanthaiah | H03K 17/962 324/661 |
| 2013/0113732 A1 | 5/2013 | Kang et al. | |
| 2013/0128416 A1 | 5/2013 | Weber | |
| 2013/0162591 A1 | 6/2013 | Hidaka et al. | |
| 2013/0176270 A1 | 7/2013 | Cattivelli et al. | |
| 2013/0234977 A1 | 9/2013 | Lin | |
| 2013/0328575 A1 | 12/2013 | Ra et al. | |
| 2014/0035599 A1* | 2/2014 | Shimata | G06F 3/044 324/658 |
| 2014/0085213 A1 | 3/2014 | Huppi et al. | |
| 2014/0085247 A1 | 3/2014 | Leung et al. | |
| 2014/0111953 A1 | 4/2014 | McClure et al. | |
| 2015/0071509 A1 | 3/2015 | Myers | |
| 2015/0135108 A1 | 5/2015 | Pope et al. | |
| 2015/0153829 A1 | 6/2015 | Shiraishi | |
| 2015/0185909 A1* | 7/2015 | Gecnuk | G06F 3/044 345/174 |
| 2015/0185946 A1 | 7/2015 | Fourie | |
| 2015/0370396 A1 | 12/2015 | Ogata et al. | |
| 2016/0033342 A1 | 2/2016 | Lyon et al. | |
| 2016/0034088 A1 | 2/2016 | Richards et al. | |
| 2016/0041648 A1 | 2/2016 | Richards | |
| 2016/0042166 A1 | 2/2016 | Kang et al. | |
| 2016/0062498 A1 | 3/2016 | Huppi et al. | |
| 2016/0070404 A1 | 3/2016 | Kerr et al. | |
| 2016/0098131 A1 | 4/2016 | Ogata et al. | |
| 2016/0103542 A1 | 4/2016 | Ogata et al. | |
| 2016/0103544 A1* | 4/2016 | Filiz | G06F 3/0414 345/174 |
| 2016/0139716 A1* | 5/2016 | Filiz | G06F 3/0414 345/174 |
| 2016/0258981 A1 | 9/2016 | Bushnell et al. | |
| 2016/0314334 A1 | 10/2016 | He et al. | |
| 2016/0378255 A1 | 12/2016 | Butler et al. | |
| 2017/0038877 A1 | 2/2017 | Kuboyama et al. | |
| 2017/0046008 A1 | 2/2017 | Chen et al. | |
| 2017/0235403 A1 | 8/2017 | Miller et al. | |
| 2017/0285746 A1 | 10/2017 | Kim et al. | |
| 2017/0322660 A1 | 11/2017 | Kuboyama et al. | |
| 2018/0048058 A1 | 2/2018 | Ehman et al. | |
| 2018/0069588 A1 | 3/2018 | Jiang et al. | |
| 2018/0088702 A1 | 3/2018 | Shutzberg et al. | |
| 2018/0138102 A1 | 5/2018 | Pan et al. | |
| 2018/0275811 A1 | 9/2018 | Filiz et al. | |

FOREIGN PATENT DOCUMENTS

| | | |
|---|---|---|
| CN | 1577385 | 2/2005 |
| CN | 1582453 | 2/2005 |
| CN | 1707415 | 12/2005 |
| CN | 1714336 | 12/2005 |
| CN | 101046720 | 10/2007 |
| CN | 101207971 | 6/2008 |
| CN | 101427468 | 5/2009 |
| CN | 101630210 | 1/2010 |
| CN | 101673001 | 3/2010 |
| CN | 101950224 | 1/2011 |
| CN | 102016780 | 4/2011 |
| CN | 201828892 | 5/2011 |
| CN | 102087432 | 6/2011 |
| CN | 102103445 | 6/2011 |
| CN | 102138120 | 7/2011 |
| CN | 102193699 | 9/2011 |
| CN | 102299166 | 12/2011 |
| CN | 102365608 | 2/2012 |
| CN | 102449583 | 5/2012 |
| CN | 102467308 | 5/2012 |
| CN | 102483673 | 5/2012 |
| CN | 103221906 | 7/2013 |
| CN | 204650590 | 9/2015 |
| EP | 2073107 | 6/2009 |
| EP | 2128747 | 12/2009 |
| EP | 2237142 | 10/2010 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| EP | 2708985 | 3/2014 |
| GB | 2313195 | 11/1997 |
| JP | S61292732 | 12/1986 |
| JP | 2000200141 | 7/2000 |
| JP | 2005031425 | 2/2005 |
| JP | 2006134144 | 5/2006 |
| JP | 2007097842 | 4/2007 |
| JP | 2007310539 | 11/2007 |
| JP | 2010225031 | 10/2010 |
| JP | 2010244252 | 10/2010 |
| JP | 2011100364 | 5/2011 |
| JP | 2011180854 | 9/2011 |
| JP | 2012511360 | 5/2012 |
| JP | WO 2012147659 A1 * 11/2012 ............. G06F 3/044 |
| JP | 2013131068 | 7/2013 |
| JP | 2014052997 | 3/2014 |
| KR | 1020100074005 | 7/2010 |
| WO | WO 97/018528 | 5/1997 |
| WO | WO 11/081882 | 7/2011 |
| WO | WO 11/156447 | 12/2011 |
| WO | WO 12/031564 | 3/2012 |
| WO | WO 12/160844 | 11/2012 |
| WO | WO 13/083207 | 6/2013 |
| WO | WO 13/183191 | 12/2013 |
| WO | WO 14/018121 | 1/2014 |
| WO | WO 12/153555 | 7/2014 |
| WO | WO 14/124173 | 8/2014 |

OTHER PUBLICATIONS

Engineers Edge, Common Plastic Molding Design Material Specification, 2015, http://www.engineersedge.com/plastic/materials_common_plastic.htm, 3 pages.

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

* cited by examiner

SECTION 1-1

SECTION 2-2

SECTION 2-2

SECTION 3-3

FORCE DETERMINATION BASED ON CAPACITIVE SENSING

CROSS REFERENCE TO RELATED APPLICATIONS

This application is a 35 U.S.C. § 371 application of PCT/US2014/015157, filed Feb. 6, 2014, and entitled "Force Determination Based on Capacitive Sensing," and further claims the benefit under 35 U.S.C. § 119(e) to U.S. provisional application No. 61/762,843, filed Feb. 8, 2013, and entitled "Force Determination Based on Capacitive Sensing," and U.S. provisional application No. 61/883,181, filed Sep. 26, 2013, and entitled "Layered Force Sensor," the contents of which are incorporated herein by reference in their entirety as if fully disclosed herein.

TECHNICAL FIELD

This application generally relates to systems and methods sensing the force of a touch, and in particular to a capacitive force sensor integrated with a device for detecting and measuring the amount or magnitude of a touch applied to a surface of the device.

BACKGROUND

Touch devices can be generally characterized as devices that are capable of receiving touch input on the surface of the device. The input may include the location of one or more touches on the device, which may be interpreted as a command, gesture, or other type of user input. In one example, touch input on a touch device may be relayed to an a computing system and used to interpret user interaction with a graphical user interface (GUI), including, for example, selecting elements on a display, reorienting or repositioning elements on a display, entering text, and user input. In another example, touch input on a touch device may be relayed to a computer system and used to interpret a user's interaction with an application program. The user's interaction may include, for example, the manipulation of audio, video, photographs, presentations, text, and the like.

Typically, touch input on a touch device is limited to the location of a touch on the device. However, in some cases, it may be advantageous to also detect and measure the force of a touch that is applied to the device. For example, it might be advantageous for a user to be able to manipulate a computer-generated object on a display in a first way using a relatively light touch and, alternatively, interact with the object a second way using a relatively heavy or sharper touch. By way of example, it might be advantageous for a user to move a computer-generated object on the display using a relatively light touch and then, alternatively, select or invoke a command with respect to the same computer using a relatively heavy or sharper touch. More generally, it might be advantageous for the user to be able to provide input in multiple ways depending on the force of the touch. For example, a user may provide input that is interpreted a first way for a light touch, a second way for a medium touch, and a third way for a heavy touch, and so on. Additionally, it might be advantageous for the user to be able to provide an analog input using a varying amount of force. This type of input may be useful for controlling, for example, a gas pedal on a simulated car or a control surface of an airplane in a flight simulator, or similar applications. It may be further advantageous for the user to be able to provide input, such as simulated body movements or otherwise, in a virtual reality (VR) simulation (possibly with haptic feedback), or in an augmented reality program. It might be further advantageous to use the force of a touch to interpret the relative degree (e.g., force) and locations of multiple touches that are provided to multiple user interface objects or elements that are in use on a touch device at the same time. For example, the force of a touch could be used to interpret multiple touches due to a user pressing more than one element in an application for playing a musical instrument. In particular, the force of multiple touches may be used for interpreting multiple touches by a user on the keys of a piano. Similarly, the force of multiple touches can be used to interpret a user's multiple touches in an application for controlling a motor vehicle (having separate controls for accelerating, braking, signaling, and turning).

SUMMARY

This application provides techniques, which can be used to measure or determine the amount or magnitude of force applied, and changes in the amount or magnitude of force applied, by a user contacting a touch device (such as a touch-sensitive surface, one example of which is a touch display), or other pressure-sensitive input elements (such as a virtual analog control or keyboard), or other input device. These techniques can be incorporated into various devices using touch recognition, touch elements of a GUI, and touch input or manipulation in an application program, such as touch devices, touch pads, and touch screens. This application also provides systems and techniques that can be used to measure or determine the amount or magnitude of force applied, and changes in the amount or magnitude of force applied, by the user when contacting a touch device, and in response thereto, provide additional functions available to a user of a touch device.

Certain embodiments described herein are directed to a force sensor, also referred to as a "force-sensing structure" or a "force sensitive sensor." The force sensor may be integrated with the housing of an electronic device, one example of which is a touch sensitive electrical device or simply a touch device. A sample force sensor may include an upper portion and a lower portion separated by a compressible element or by an air gap. The upper portion may include an upper body connected to an upper capacitive plate and the lower portion may include a lower body connected to a lower capacitive plate. In some cases, the upper portion and the lower portion form a capacitor that can be used to measure or detect an amount or magnitude of applied force. In other cases, the upper portion and the lower portion are attached to another type of force sensor, such as a strain gauge. The compressible element is typically formed form a compliant or springy material. In some cases, the compressible element is referred to as a "deformable middle body," an intermediate element, or a "compressible layer."

In one embodiment, techniques can include providing a force-sensitive sensor incorporated into a touch device having a rigid cover glass. For example, a touch device can sense an applied force on a touch device by measuring the displacement of the cover glass, either at an edge of the cover glass or in an active display area of the cover glass. The cover glass can be set on a resilient or springy base, so that an applied force causes displacement along a Z-axis of the cover glass (e.g., normal to the surface of the cover glass). By sensing a particular Z displacement of a point along the edges of the cover glass, or in the active display area of the cover glass, an approximation of the [X, Y] location of the applied force can be determined. Where multiple forces are applied at different locations, a force centroid can be determined, from which the location of one or more individual forces can be determined.

In one embodiment, the cover glass is relatively rigid, and mounted along a perimeter attached to one or more capacitive sensors. In this case, when a force is applied at an [X, Y] location on the cover glass, the applied force can be resolved as a force vector at one or more edges of the perimeter of the cover glass, such as can occur in response to a rotation about either the X or Y axes of the cover glass, or a combination thereof. In such cases, one or more edges or portions of the edges of the cover glass can be displaced, with the effect that displacement can be measured by one or more capacitive sensors. For example, the one or more capacitive sensors can be positioned under a color mask or other optically opaque or concealing element at an edge of the cover glass, without being readily visible to a user. One or more capacitive sensors can then be used to determine a displacement of the edge of the relatively rigid cover glass. A processor using information from those one or more capacitive sensors, in combination with touch location information from one or more touch sensors, would be able to determine both the magnitude of an applied force and the [X, Y] location on the cover glass at which the force is applied.

In such embodiments, the relatively rigid cover glass can be mounted on a relatively springy (or otherwise resilient) perimeter mount. For a first example, the perimeter mount can include first and second capacitive elements, with a compressible element, such as a relatively springy intermediate element, positioned between the first and second capacitive elements. The relatively springy intermediate element can include a microstructure including silicone elements, or other relatively springy elements constructed or otherwise positioned in between the first and second capacitive elements. For a second example, the perimeter mount can include a self-capacitive or mutual capacitive circuit mounted with respect to the cover glass, with a relatively springy element positioned to buffer against excess displacement of the cover glass.

In such cases, a displacement of the relatively rigid cover glass can cause the relatively springy intermediate element to be compressed or stretched, depending on the displacement of the cover glass. In this case, the displacement of the cover glass can be measured or detected by the one or more capacitive sensors (whether mutually capacitive or self-capacitive, or a mixture thereof) by measuring a change in distance between the cover glass and a base of the perimeter mount. This allows a processor, receiving information from the one or more capacitive sensors, to determine a location and measure of displacement of the cover glass. This allows the processor to determine a magnitude and location of applied force on the cover glass. For example, if a force is applied to the cover glass, the processor can determine, in response to an amount and angle of pitch, tilt, or yaw of the cover glass, at what location that force is being applied, and a measure of how much force is being applied.

In one embodiment, the cover glass can be relatively deformable, mounted along a perimeter, and provided with one or more force sensors (such as capacitive sensors) positioned below the cover glass at one or more [X,Y] locations. The force sensors can be used to determine an amount of deformation due to an applied force on the cover glass. For example, the one or more force sensors can include capacitive sensors positioned below the cover glass (relative to a user), such as below an LCD stack or other display circuit.

In such cases, when a force is applied to the cover glass, the one or more force sensors can measure a Z displacement of the cover glass at each respective [X, Y] location. In this configuration, the one or more force sensors can provide information indicative of a multi-dimensional field of values indicating a relative amount of deformation of the cover glass at each [X, Y] location. From this information, a processor or other circuit can determine a centroid of applied force. From this information, a processor or other circuit can determine one or more [X, Y] locations where force is being applied, and a magnitude of force being applied at each such location.

In one embodiment, the one or more force sensors are configured to be relatively resistant to changes in temperature or other effects. In this case, the one or more force sensors can be maintained with a relatively known amount of response to applied force, with the effect that a relatively constant amount of applied force will provide a relatively constant response from the one or more force sensors.

In one embodiment, effects on the cover glass at its edges and at other locations can be substantially measured in combination or conjunction. In this case, information from the one or more capacitive sensors at the edges of the cover glass, and information from the one or more capacitive sensors positioned at other locations with respect to the cover glass, can be combined to provide a measure of applied force. A processor or other circuit can then determine one or more [X, Y] locations where force is being applied, and an amount or magnitude of force being applied at each such location, in response to the combination or conjunction of that information.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

DETAILED DESCRIPTION

Figure 1:
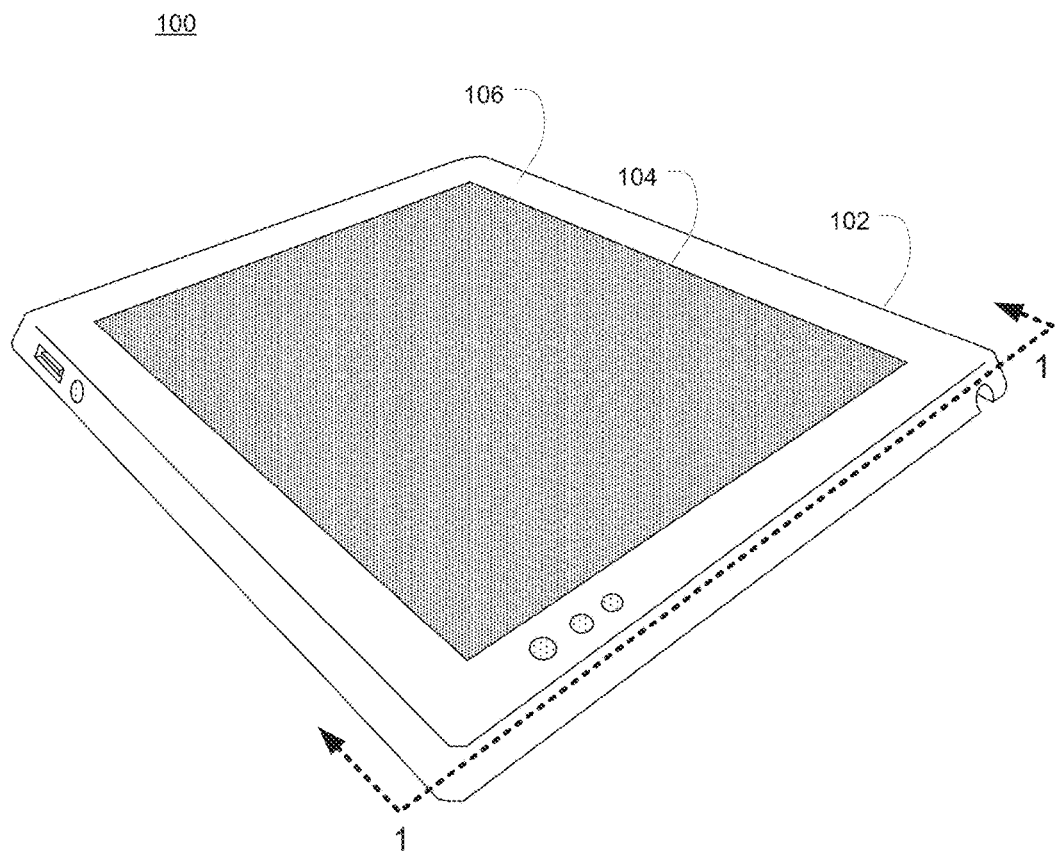
FIG. 1 depicts an example touch device.

Generally, embodiments may take the form of an electronic device capable of sensing force and distinguishing between multiple different levels of force, beyond simple binary sensing. Some embodiments may have an enclosure incorporating a force sensor therein (e.g., a force-sensitive sensor, a force-sensing element, or force-sensing structure). The force sensor may be incorporated in, for example in a groove, cutout, or aperture formed in one or more sidewalls or other surfaces of the device. The force-sensing element may extend along an entire periphery, sidewall, or set of sidewalls in certain embodiments. For example, the force sensor may encircle an interior cavity formed within the device, or may otherwise extend around an interior of the device. As force is exerted on an exterior of the device, such as an upper surface, the force sensor may detect the force and generate a corresponding input signal to the device.

Some embodiments may incorporate multiple force sensors spaced about a perimeter of the electronic device, rather than a single force-sensing structure or element. Further, the multiple force sensors need not form a continuous array or structure, but may be discretely spaced from one another. The number of force sensors may vary between embodiments, as may the spacing. Each force sensor may sense a force exerted on an adjacent or nearby surface within a certain region of the device. Thus, a force exerted at a point that is between two underlying force sensors may be sensed by both.

Generally, the force sensor or device may include one or more capacitive plates, traces, flex, or the like that are separated by a compressible element (e.g., a compliant member). As a force is transmitted through the device enclosure and to the force sensor, the compressible element may compress, thereby bringing the capacitive plates closer together. The change in distance between the capacitive plates may increase a measured capacitance therebetween. A circuit may measure this change in capacitance and output a signal that varies with the change in capacitance. A processor, integrated circuit or other electronic element may correlate the change in capacitance to a force exerted on the enclosure, thereby facilitating the detection, measurement, and use of force as an input to an electronic device. Although the term "plate" may be used to describe the capacitive elements, it should be appreciated that the capacitive elements need not be rigid but may instead be flexible (as in the case of a trace or flex).

1. TERMINOLOGY

The following terminology is exemplary, and not intended to be limiting in any way.

The text "applied force", and variants thereof, generally refers to the force of a touch applied to a surface of the device. Generally, the degree, amount, or magnitude of the applied force can be detected and measured using the techniques described herein. The degree, amount, or magnitude of an applied force need not have any particular scale. For example, the measure of applied force can be linear, logarithmic, or otherwise nonlinear, and can be adjusted periodically (or otherwise, such as aperiodically, or otherwise from time to time) in response to one or more factors, either relating to applied force, location of touch, time, or otherwise.

The text "finger", and variants thereof, generally refers to a user's finger, or other body part. For example and without limitation, a "finger" can include any part of the user's finger or thumb and any part of the user's hand. A "finger" may also include any covering on the user's finger, thumb, or hand.

The text "touch," and variants thereof, generally refers to the act of an object coming into contact with a surface of a device. The object may include a user's finger, a stylus or other pointing object. Example objects include, a hard stylus, a soft stylus, a pen, finger, thumb or other part of the user's hand. A "touch" typically has an applied force and a location that can detected and measured using the techniques described herein.

After reading this document, those skilled in the art would recognize that these statements of terminology would be applicable to techniques, methods, physical elements, and systems (whether currently known or otherwise), including extensions thereof inferred or inferable by those skilled in the art after reading this application. Likewise, it should be appreciated that any dimensions set forth herein are meant to be examples only, and may change from embodiment to embodiment.

2. FORCE-SENSITIVE DEVICE

In one embodiment, a force sensitive device and system can include a cover glass element, such as a relatively transparent (in most or all locations) substance capable of isolating circuitry or other internal elements of the touch device from external objects. The term "glass" refers to the relatively hard sheet-like qualities of the material and does not limit the material of the cover glass element to only glass materials. The cover glass element may be made from a variety of materials including, for example, glass, treated glass, plastic, treated plastic, and sapphire. In many cases, the cover glass is transparent, however it is not necessary that the cover glass be completely or even partially transparent. The cover glass can be disposed in a substantially rectilinear shape, such as to cover the circuit for the touch device and to serve as a touch plate for the user. The cover glass may also be formed in a variety of other shapes depending on the application.

In some embodiments, the cover glass is integrated with or attached to a transparent or non-transparent touch sensor that is configured to detect the location of a touch. The transparent touch sensor may be a capacitive touch sensor formed from one or more arrays of transparent conductive lines. For example, the transparent touch sensor may be a mutually capacitive touch sensor formed from two arrays of transverse transparent conductive lines operatively coupled to touch sensing circuitry. Such a transparent touch sensor may be able to detect and track multiple touches on the surface of the cover glass. The touches may include multiple finger touches, multiple stylus touches, or a combination of different types of touches on the cover glass. Other types of transparent touch sensors may also be used, including, for example, self-capacitive touch sensors, resistive touch sensors, and the like.

In one embodiment, the cover glass element is coupled to a frame or housing for the touch device, such as a case constructed of metal, elastomer, plastic, a combination thereof, or some other substance. In such cases, the frame for the touch device can include a shelf or ledge on which the cover glass element is positioned. The cover glass is typically positioned above the circuitry for the touch device. For example, the frame can include a shelf on which an edge of the cover glass element is positioned, with the (or some of the) remainder of the cover glass element positioned over the circuitry for the touch device.

In many of the embodiments described herein, a force sensor, (e.g. a force-sensing structure, force-sensing element, or force sensitive sensor), is positioned below the cover glass and the shelf or ledge of the frame or housing. The force sensor typically includes a compressible element and is configured to detect and measure a relative displacement between the cover glass and the frame or housing. As previously mentioned, the amount that the cover glass is displaced can be used to estimate the applied force. The following embodiments are directed to different techniques and methods of detecting and measuring this displacement.

3. EXEMPLARY DEVICES HAVING A FORCE SENSOR

FIG. 1 depicts an exemplary device 100 that incorporates one or more force-sensing structures, as described herein. With respect to FIG. 1, the device 100 is depicted as a tablet computing device, but it should be appreciated that it may also be any of a number of other devices, including a mobile phone, portable computer, wearable device, touch screen, and the like. The device 100 may have an enclosure 102 including multiple sidewalls and a bezel 106. In other embodiments, the device 100 may be flush-mounted into a larger surface or enclosure and so the device may lack an identifiable bezel or sidewall.

As shown in FIG. 1, the electronic device 100 includes an electronic display, located beneath a cover glass 104, for conveying graphical and/or textual information to the user. The electronic display may include a liquid crystal display (LCD), organic light omitting diode (OLED), or other electronic display component. In some embodiments, the display may be omitted. For example, the cover glass may be placed over a control button or track pad that is not configured to convey graphical and/or textual information to the user. (In such a case, the cover glass may not be transparent.)

As shown in FIG. 1, the device includes multiple ports and mechanisms for electrically and mechanically coupling the device to external devices or elements. The input mechanisms, ports, and the like may vary between versions, types and styles of the electronic device 100. Accordingly, they are shown in FIG. 1 only as examples of such devices and in sample positions.

Figure 2A:
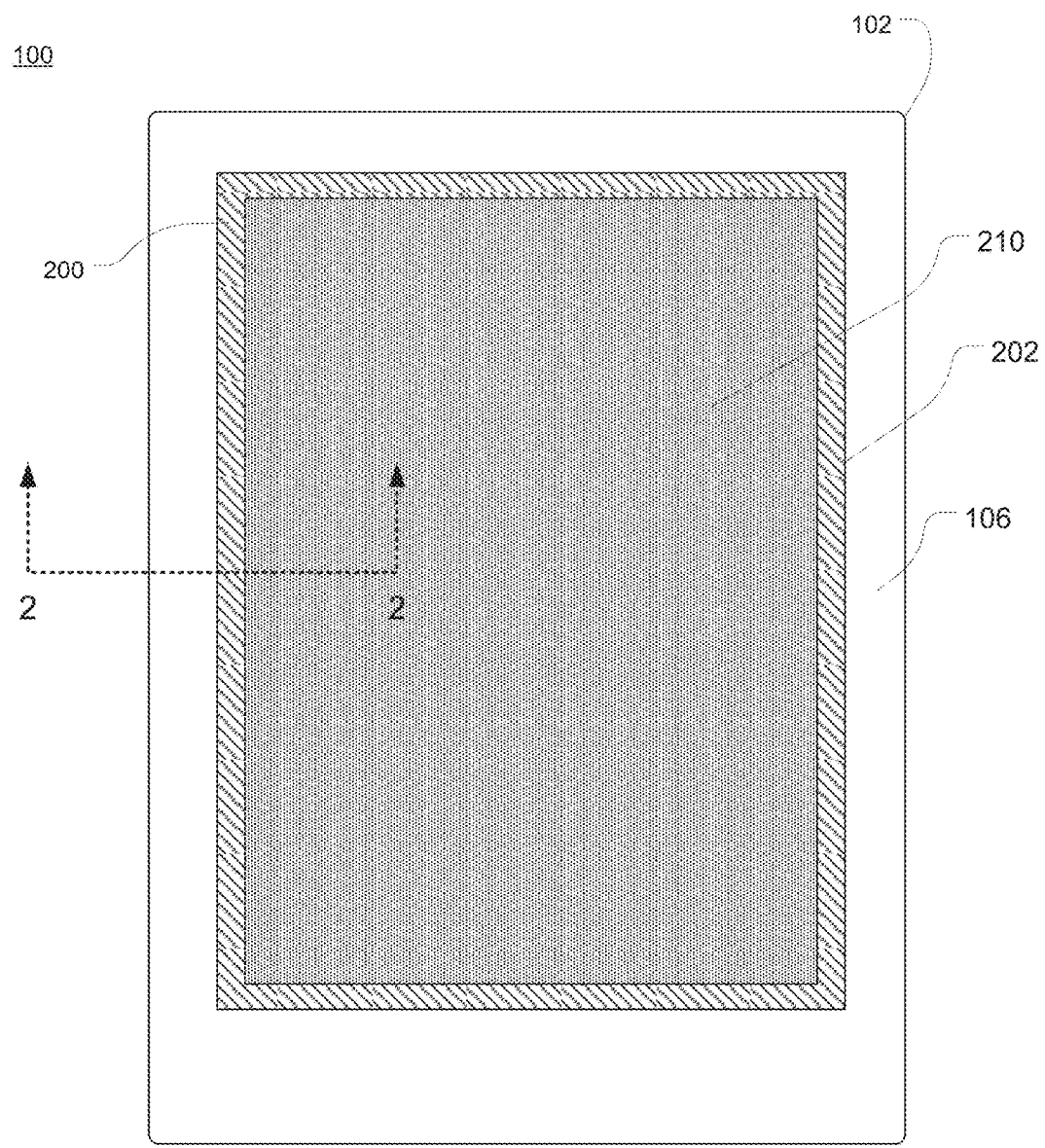
FIG. 2A depicts a cross-sectional view taken along line 1-1 of FIG. 1, of an example touch device having a force-sensing structure.

FIG. 2A depicts a cross-sectional view taken along line 1-1, shown in FIG. 1. the cross-sectional view depicts the interior of a device 100 having one type of force-sensing structure. A central portion of the enclosure 102 may enclosure electronic circuitry, mechanical structures, and other internal elements 210. As shown in the figure, a bezel 106 is formed around the perimeter of the device 100.

A ledge 202 may be formed along the perimeter of the bezel 106. The exact dimensions of the ledge 202 may vary between embodiments. In this embodiment, the ledge 202 includes a width configured to support the base of a force-sensing structure 200. The base of the force-sensing structure 200 may abut and attach to the top of the ledge 202 in certain embodiments. Likewise, as shown in FIG. 2A, an inner edge of the force-sensing structure 200 may be parallel and approximately aligned with an inner surface of the bezel 106. In other embodiments, the inner edge of the force-sensing structure 200 may be offset from an inner edge of the bezel 106.

As shown in FIG. 2A, a single force-sensing structure 200 may encircle the entirety of the inner cavity of the enclosure 102. That is, the force-sensing structure 200 may extend along the entirety of the perimeter of the device and along the ledge 202. Thus, it may be appreciated that the force-sensing structure 200 may be formed as a single unit or element.

Figure 2B:
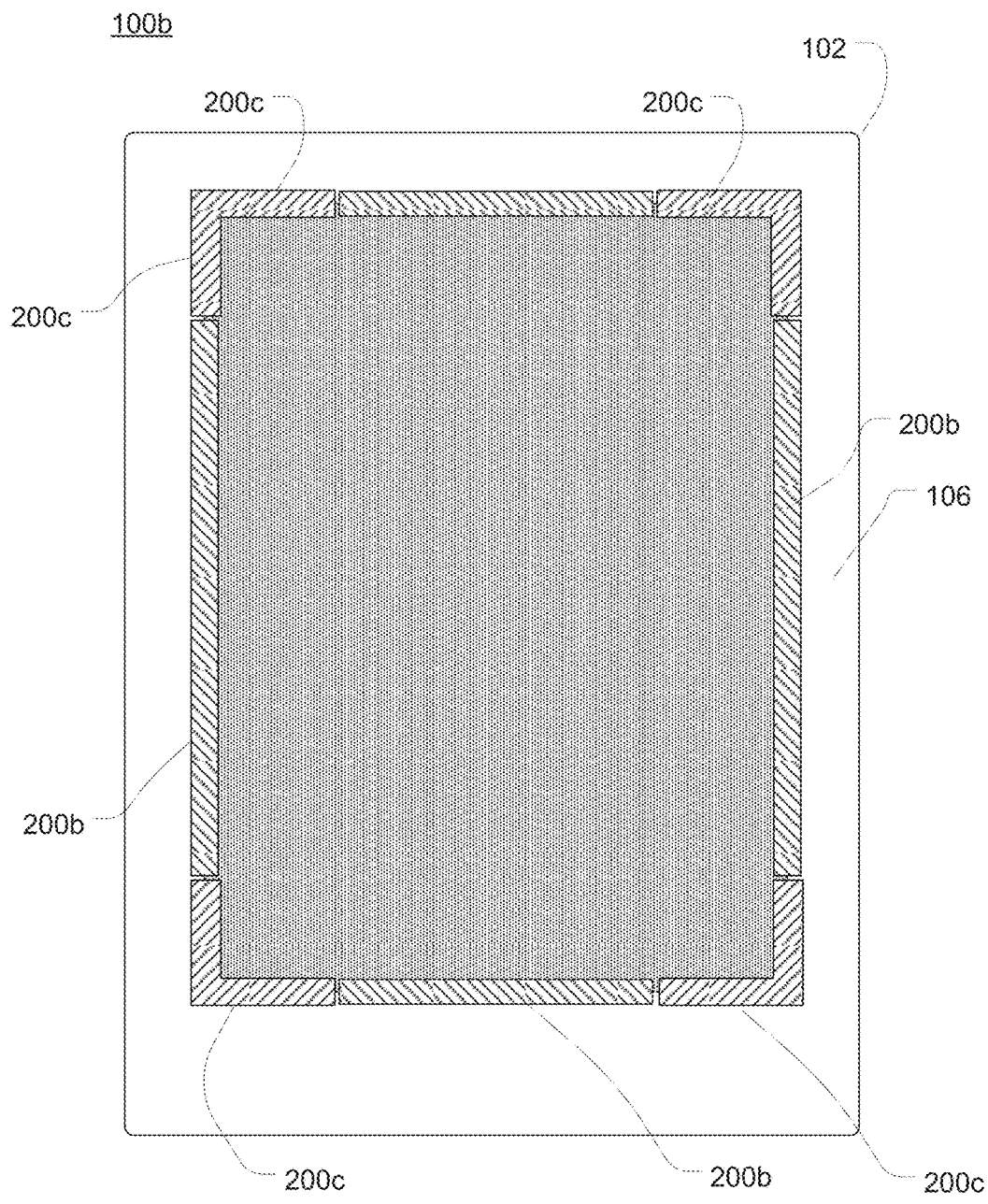
FIG. 2B depicts a cross-sectional view taken along line 1-1 of FIG. 1, of an example touch device having an alternative force-sensing structure.

FIG. 2B depicts an alternate cross-sectional view taken along line 1-1, shown in FIG. 1. As shown in FIG. 2B, the device 100b includes an alternative force-sensing structure 200b. In the alternative embodiment of FIG. 2B, multiple force-sensing structures 200b may be placed at different locations along the perimeter of the bezel 106. In this example, a force-sensing structure 200b is placed at or near each edge of the bezel 106 of the electronic device 100b. Additionally, a force-sensing structure 200c is placed at each of the corners of the bezel. Thus, in the example device 100b shown in FIG. 2B, there are eight force-sensing structures (200b, 200c).

With regard to FIG. 2B, it should be appreciated that more or fewer force-sensing structures 200b may be used. For example, three force-sensing structures 200b may be used and a location of a force may be triangulated by comparing the outputs of each device. Alternately, an array of more than four force-sensing structures 200b may be used in a device. Additionally, each of the force-sensing structures shown in FIG. 2B may represent a number of individual force-sensing structures in a linear or two-dimensional array, for example. Accordingly, the number and positioning of the various force-sensing structures 200b depicted in FIG. 2B is merely exemplary and other variations are possible.

Figure 3:
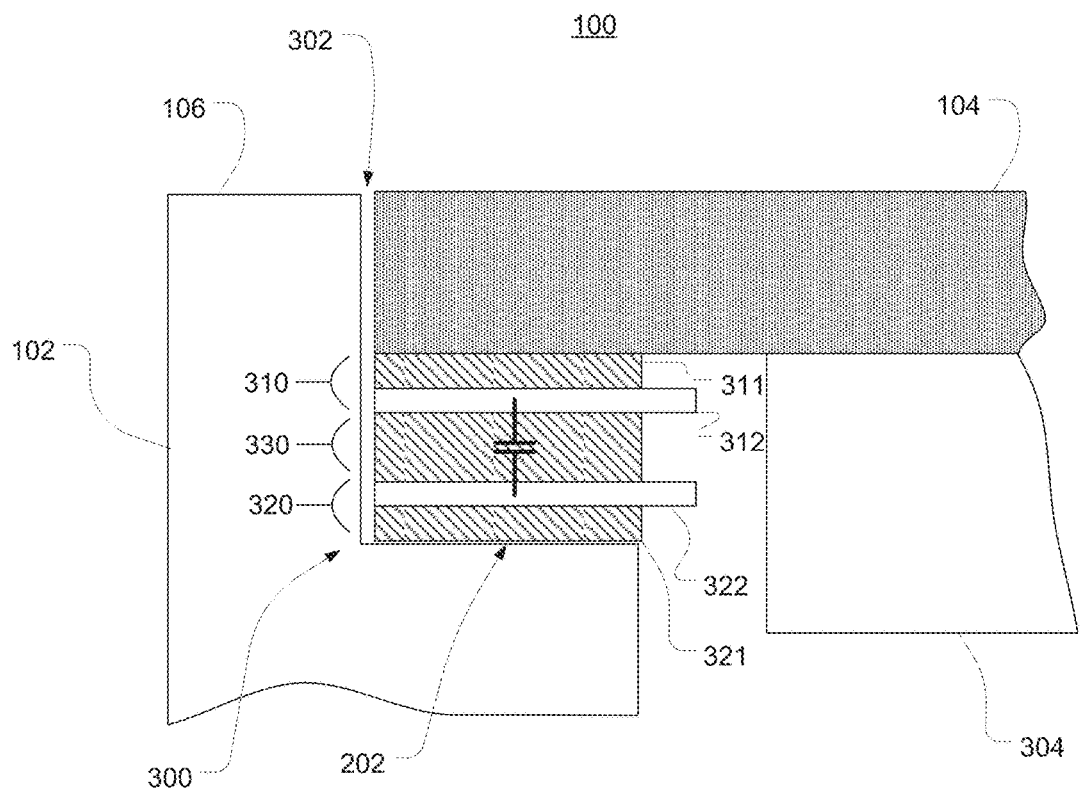
FIG. 3 depicts a cross-sectional view taken along line 2-2 of FIG. 2, of an example touch device having a force-sensing structure.

FIG. 3 depicts a cross-sectional view taken along 2-2 of the electronic device 100, as shown in FIG. 2A. As shown in FIG. 3, the physical relationship between the cover glass 104, bezel 106, and force-sensing structure 300 is shown in more detail, although it should be appreciated that the exact geometry, sizes, tolerances, positions and the like may vary. As shown in FIG. 3, the force-sensing structure 300 may be mounted or otherwise be positioned beneath a portion of the cover glass 104. A display element 304 may likewise be positioned beneath the cover glass 104. In some embodiments, the force-sensing structure 300 may be concealed from external view by an ink or print layer deposited on the cover glass between the cover glass 104 and the force-sensing structure 300. In other embodiments, the ink or print layer may be omitted.

As shown in FIG. 3, the bezel 106 is adjacent to the ledge 202, which is recessed from the surface of the bezel 106 and is configured to support the force-sensing structure 300. As shown in FIG. 3, a gap 302 may exist between the interior edge of the bezel 106 and the outer edge of the cover glass 104. The gap may allow free movement of the cover glass 104 with respect to the enclosure 102.

As shown in FIG. 3, the force-sensing structure 300 includes multiple layers. In this example, the force-sensing structure includes an upper portion 310 and a lower portion 320 separated by a deformable middle body or compressible element 330. The upper portion 310 includes an upper body 311 which may be formed from a layer of polyimide flex material. The upper portion 310 also includes an upper capacitive plate 312 formed from a layer of copper bonded to or deposited on the upper body 311. Likewise, the lower portion 320 includes a lower body 321 which may also be formed from a layer of polyimide flex material. The lower portion 320 also includes a lower capacitive plate 322 formed from a layer of copper bonded to or deposited on the lower body 321. In this example, the polyimide flex material is approximately 0.05 millimeters thick. However, other thicknesses and other materials may be used to form the force-sensing structure 300.

As shown in FIG. 3, a capacitance (shown by the capacitor symbol) may be formed between the upper and lower capacitive plates 312, 322, which, in this example, are separated by the compressible element 330. In this example, the compressible element 300 is formed from a silicone material approximately 0.2 millimeters thick with a tolerance of plus or minus 0.09 millimeters. In other embodiments, the compressible element 300 may be formed from a different material and have a different thickness.

The force-sensing structure 300 depicted in FIG. 3 can be used to detect and measure a user-applied force. For example, a user may press down on the cover glass 104 (or on an upper surface of the electronic device 100, in embodiments lacking a display and/or cover glass) to exert a force on the device 100. The cover glass 104 may move downward in response to the force, compressing the compressible element 330 of the force-sensing structure 300. In some cases, the compressible element 330 becomes flattened by the compression resulting the in first and second capacitive plates 312, 322 moving closer together. As a result, the capacitance between the first and second capacitive plates 312, 322 may change. As previously mentioned, a change in capacitance may produce an electrical signal or change in an electrical signal, which may be detected and measured by associated circuitry and may be used to estimate the force exerted on the cover glass 104 by the user.

As shown in FIG. 3, the upper and lower capacitive plates 312, 322 may extend outward from the upper and lower bodies 311, 321, respectively. That is, at certain locations along the length of the force-sensing structure 300, a portion of the capacitive plates 312, 322 may be bare and exposed. The exposed portion of the capacitive plates may facilitate connection to a wire, conduit, or other electrical connection and allow signals to be communicated between the force-sensing structure 300 and associated electronic circuitry in order to measure capacitance changes and estimate force.

In some embodiments, a second, auxiliary structure may be formed within the device 100 or within a segment of the force-sensing structure. The auxiliary structure may also include an upper capacitive plate and a lower capacitive plate separated by a compressible element. However, the auxiliary structure may not be configured to be compressed by the cover glass 104, and instead may serve as a reference capacitance used to account for changes in environmental conditions surrounding the device. For example, the elasticity and/or compressibility of the compressible element (e.g., a silicone material) may vary due to changes in the amount of absorbed moisture. In this case, it may be advantageous to use an auxiliary structure to measure (directly or indirectly) changes in the physical properties of the compressible element to account for changes in the moisture content. In one example, the auxiliary structure may form a capacitor with the upper and lower capacitive plates separated by a compressible element. The capacitor may be connected to a second electrical circuit that monitors the capacitance between the plates of the auxiliary structure separately from any force-sensitive structure. The auxiliary structure may be positioned in a part of the device such that it does not experience any (or very little) compression when a user presses down on the cover glass but is still exposed to the same or a similar environment as the force-sensing structure. Thus, any changes in the capacitance between the plates of the auxiliary structure may be purely due to absorbed moisture and/or aging of the compressible element (e.g., a silicone material). The output signal from the auxiliary structure may be used to adjust readings from force-sensitive structure to compensate for changes in the environmental conditions that affect the physical properties of the compressible element.

Figure 4:
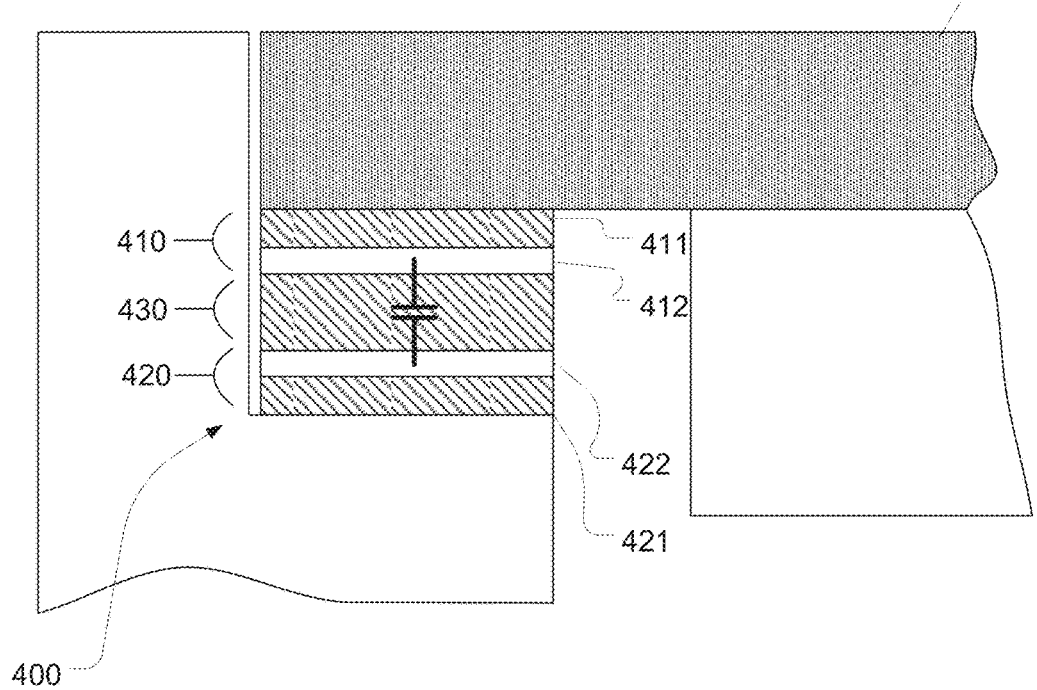
FIG. 4 depicts a cross-sectional view taken along line 2-2 of FIG. 2, of an example touch device having a force-sensing structure.
Figure 5:
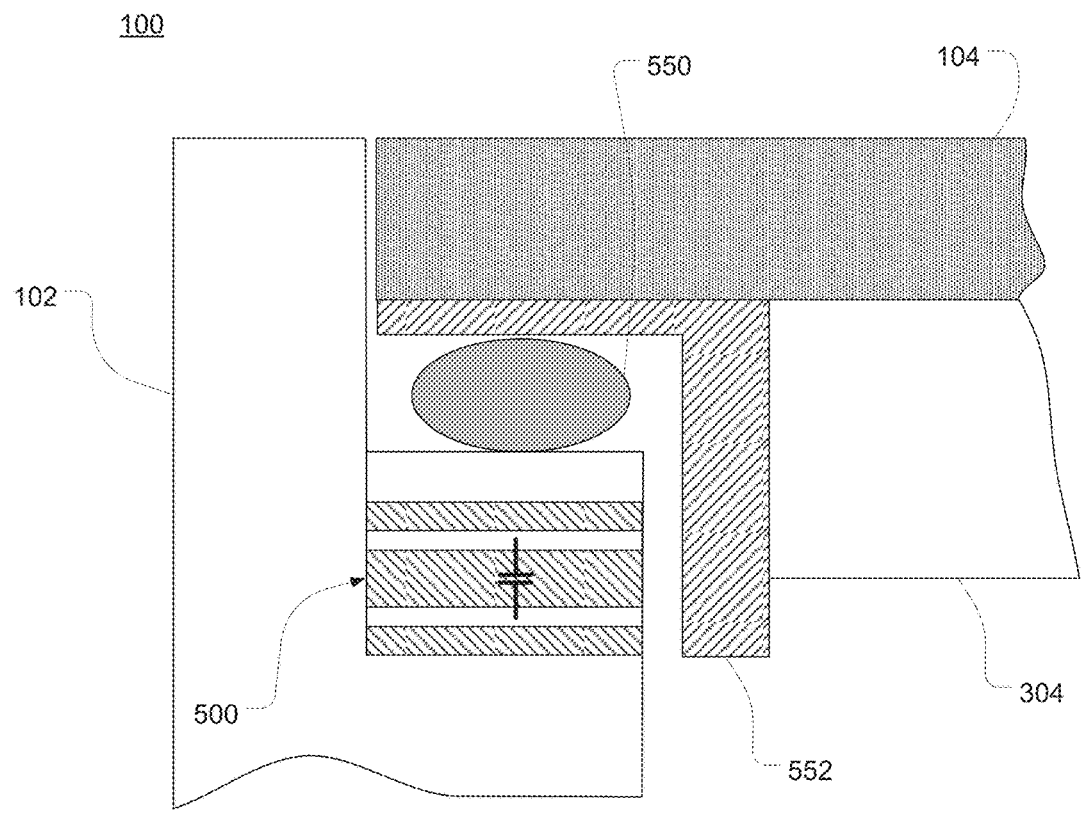
FIG. 5 depicts a cross-sectional view taken along line 2-2 of FIG. 2, of an example touch device having a force-sensing structure.

FIGS. 4 and 5 depict alternative embodiments of a force-sensitive structure. Specifically, FIG. 4 depicts a force-sensitive structure 400 having an upper portion 410 including an upper body 411 attached to an upper capacitive plate 412. The force-sensitive structure 400 also includes a lower portion 420 including a lower body 421 attached to a lower capacitive plate 422. The upper and lower portions 410, 420 are separated by a compressible element 430 and form a capacitor that can be used to detect a force applied to the cover glass 104. In the example depicted in FIG. 4, the upper and lower capacitive plates 412, 422 do not extend beyond the upper and lower bodies 411, 421. In this case, electrical communication with the force-sensitive structure 400 may be facilitated by an electrical terminal or conduit located within the profile of the force-sensitive structure 400.

FIG. 5 depicts another alternative embodiment of an electronic device 100 incorporating a force-sensitive structure 500. In this embodiment, an environmental seal 550 may be positioned between the cover glass 104 and the force-sensitive structure 500 to prevent ingress of moisture, dust, dirt, and other potential environmental contaminants. The environmental seal 550 may be formed, for example, from an extruded compliant material, such as Buna rubber, Viton, EPDM, or the like. In some cases, the environmental seal 550 is formed as a bead of sealant material that cures after being applied to an element of the device 100.

Optionally, as shown in FIG. 5, the device may also include a support 552 positioned between the seal 550 and the cover glass 104 to provide a bonding surface for the environmental seal 550. In this example, the support 552 is attached to the cover glass 104 and, therefore, is movable with respect to the enclosure 102. Thus, as a force is applied to the cover glass 104, the cover glass 104, optional support 552, and seal 550 may all move downward to compress the force-sensing structure 500. Thus, in the present embodiment, the seal 550 can be used to isolate the force-sensing structure 500 from moisture and external debris while still allowing operation force-sensing structure 500. In addition to or in place of the seal 550, the device 100 may also include one or more wiping seals located between an edge of the cover glass 104 and a portion of the enclosure 102. Furthermore, a baffle seal or membrane may be installed between the cover glass 104 and a portion of the enclosure 102, the baffle seal configured to prevent contaminates from entering the internal portion of the device 100.

In some embodiments, the environmental seal 550 is compliant and in other embodiments, the environmental seal 550 is not compliant and may be rigid. A rigid seal may be advantageous by transmitting force to the force-sensing structure 500 directly, while a compliant or flexible seal may compress somewhat before transmitting any force. Either type of seal may be used, although the output of the force-sensitive structure 500 may be affected by compression of a flexible seal.

Figure 6:
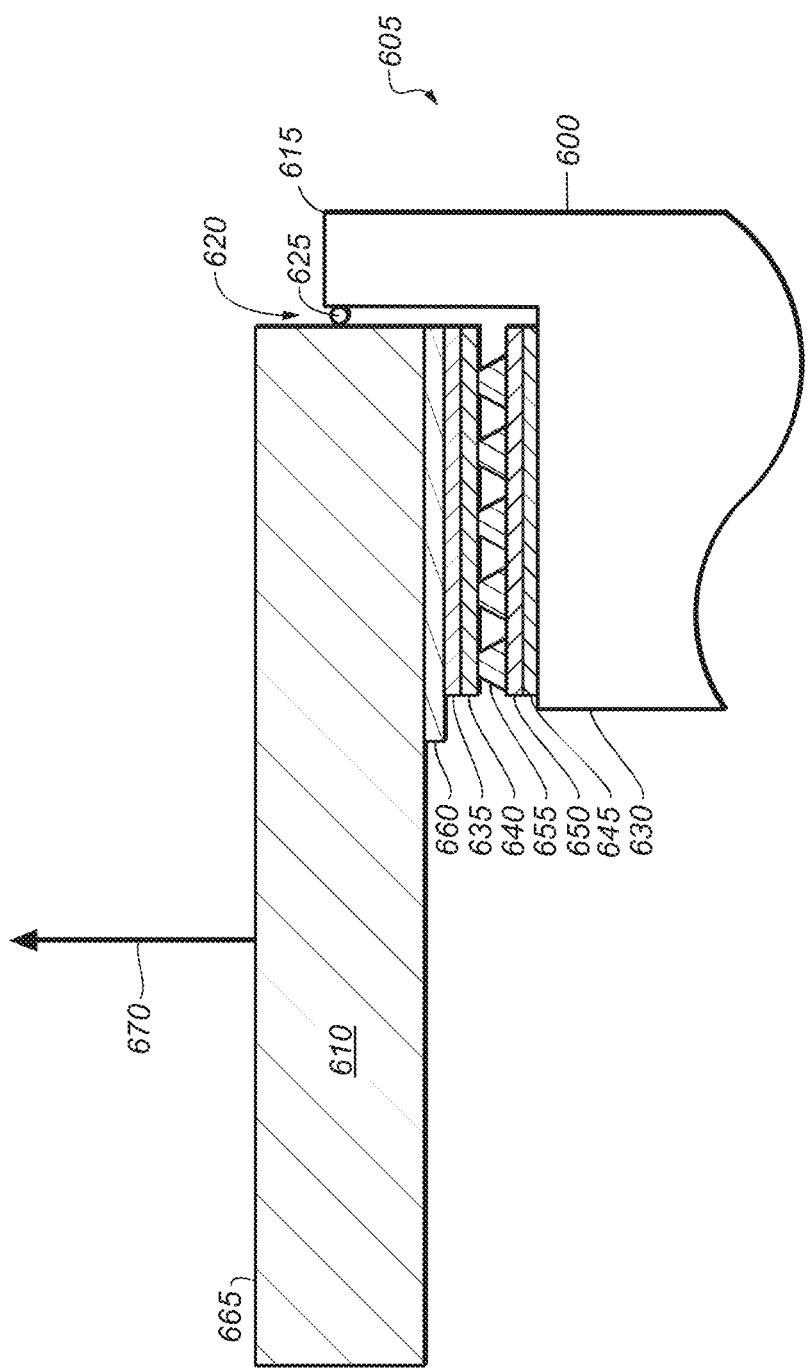
FIG. 6 depicts a cross-sectional view of an embodiment of a touch device having a capacitive force sensor.

FIG. 6 depicts another alternative embodiment of a device having a capacitive force sensor. As shown in FIG. 6, a touch device case 605 (e.g., housing) can be shaped and positioned to hold a cover glass element 610. For example, the touch device case 605 can include a rectilinear frame, such as having a shape of a picture frame, with the cover glass element 610 having the shape of a picture cover (as would occur if a picture were placed below the cover glass element 610). The touch device case 605 can include a backing (not shown) or a midframe element (not shown), which can stabilize the touch device case 605 against bending, warping, or other physical distortion. The touch device case 605 can also define a space in which circuitry for the touch device (as described herein) can be positioned. This has the effect that the circuitry for the touch device can be protected against foreign contaminants or unwanted touching, and against bending or warping, or other electrical or physical effects that might possibly cause circuitry errors or other problems for the touch device.

As shown in FIG. 6, the touch device case 605 can include an outer edge 615, such as can be defined by an outer lip or a protrusion upward from a baseline of the touch device case 605, and which can be positioned to prevent excess slippage or other movement of the cover glass element 610 in either an X or Y direction. In this context, a Z direction generally indicates a direction substantially normal (likely to be at a 90 degree angle, but this is not required) to a plane of the cover glass element 610 and a top surface of the touch device, while the X and Y directions generally indicate directions substantially within the same plane of the cover glass element 610 (likely to be at 90 degree angles with respect to each other, but this is not required).

As shown in FIG. 6, the cover glass element 610 and the outer edge 615 define a cover glass gap 620 between them, with the effect that the cover glass element 610 does not bump or rub against the touch device case 605. In one embodiment, the touch device can include an optional elastomer 625, or other substance, positioned between the cover glass element 610 and the outer edge 615. This can have the effect of providing shock absorption in the event of a sudden acceleration of the cover glass element 610 in the direction of the outer edge 615, such as in the event the touch device is dropped, hit, kicked, or otherwise catastrophically moved. For example, the elastomer 625 can be disposed around the edges of the cover glass element 610, with the effect of forming an O-ring shape or similar shape. The elastomer 625 can also have the effect of preventing, or at least militating against, foreign object damage that might be caused by dust or other objects slipping between the cover glass element 610 and the outer edge 615.

As shown in FIG. 6, the touch device case 605 includes a cover glass shelf 630, such as can be defined by an inner lip or internal protrusion inward from the outer edge 615 of the touch device case 605, and which can be positioned to support the cover glass element 610. For example, the cover glass element 610 can rest on the cover glass shelf 630, which can prevent the cover glass element 610 from slipping down into the circuitry for the touch device. In alternative embodiments, the touch device case 605 can include a midframe (not shown), such as can be defined by an internal support element positioned to support the cover glass element 610. For example, the midframe can include a relatively solid (absent optional holes) element positioned to support at least some of the circuitry for the touch device.

As shown in FIG. 6, the device includes a force-sensing structure 600. In this example, the force-sensing structure 600 includes a first upper portion comprising a first pressure sensitive adhesive (PSA) layer 635, having a thickness of about 100 microns and a first flex circuit 640. The first flex circuit 640 includes a set of drive/sense lines configured to conduct electric signals and/or act a capacitive plate. The force-sensing structure 600 also includes a lower portion comprising a second PSA layer 645, such as also having a thickness of about 100 microns, and a second flex circuit 650 also having conductive drive/sense lines for conducting signals and acting as a capacitive plate. The first flex circuit 640 and the second flex circuit 650 are configured to operate in response to control by the drive/sense lines and can form a capacitive sensor. As explained above with respect to previous embodiments, changes in the capacitance between the upper and lower portions of the force-sensing structure 600 may be related to an amount of deflection or change in distance between the first flex circuit 640 and the second flex circuit 650. (In other embodiments, one or more strain gauges can be used instead of a capacitive sensor.) In one example, if the cover glass element 610 is tilted (such as by pressure or other applied force), the first flex circuit 640 and the second flex circuit 650 can become closer or become farther away, depending on location with respect to the axis and location of tilt. As further described herein, the first flex circuit 640 and the second flex circuit 650 can be replicated in several locations on the touch device case 605.

The force-sensing structure 600 is typically operatively connected to a force-sensing circuit configured to detect and measure changes in capacitance. My measuring changes in capacitance, the force-sensing circuit can be used to estimate relative displacement of one or more force-sensing structures which, in turn can be used to determine an axis and location of tilt of the cover glass element 610. Furthermore, the changes in capacitance can be used to estimate a force applied to the cover glass element 610. In some embodiments, the force-sensing circuit includes or is coupled to a processor.

In one embodiment, a region between the first flex circuit 640 and the second flex circuit 650 can define a substantially empty space (that is, filled with air). In alternative embodiments, the region between the first flex circuit 640 and the second flex circuit 650 can include a compressible layer 655. For a first example, the space between the first and second flex circuits 640, 650 can include a set of spring elements interspersed within the space. In this case, the first flex circuit 640 and the second flex circuit 650 are held apart by spring forces and do not generally touch. For a second example, the compressible layer 655 can include a microstructure constructed at least in part from silicone, such as a set of silicone pyramids or a set of silicone springs, also with the effect that the first flex circuit 640 and the second flex circuit 650 are held apart by a spring force and do not generally touch.

As described generally above, the cover glass element 610 may include a transparent touch sensor that is configured to detect the location of one or more touches. As mentioned previously, the transparent touch sensor may be formed from one or more arrays of transparent conductive lines coupled to touch sensor circuitry. Types of transparent touch sensors that may be integrated into the cover glass element 610, include, without limitation, mutual capacitive sensors, self-capacitive touch sensors, and resistive touch sensors.

In one embodiment, an area of the cover glass element 610 above the first flex circuit 640 and the second flex circuit 650 can be covered with an ink mask 660. In one embodiment, the ink mask 660 is disposed below the cover glass element 610 and above the first flex circuit 640. This has the effect that a user of the touch device does not generally see either the first flex circuit 640 or the second flex circuit 650, or any of the elements coupling them to the touch device case 605, the cover glass element 610, or any circuits for touch device (not shown). For example, the touch device can include a surface 665, which can include a surface of the cover glass element 610 in places where the ink mask 660 is absent, and can include a surface of the ink mask where the ink mask 660 is present. As described above, a Z direction 670 can indicate a direction substantially normal to the surface 665 of the touch device.

In one embodiment, the interaction between the cover glass element 610 and the outer edge 615 may result in a set of forces at the outer edge of the cover glass element 610. In some embodiments, a force-sensing structure 600 (or alternatively a strain gauge) is placed at two or more edges of the cover glass element 610. Each of the two or more force-sensing structures may be operatively coupled to force-sensing circuitry in the touch device and can be used to detect and measure these forces. Additionally, by estimating the relative displacement in each of the two or more force-sensing structures, the circuit can be used to determine a normal vector to the cover glass element 610 that represents a location of applied force (that is, a location of the normal vector) as well as an amount applied force (that is, a magnitude of the normal vector).

In one embodiment, the normal vector can be determined in response to an amount of tilt of the cover glass element or an amount of pressure at a X and the Y location. For example, a set of displacements can be measured using two or more force-sensing structures located at one or more edges on the perimeter of the cover glass element. In one embodiment, the displacements are proportional or can be correlated to one or more applied forces. A total force Fz can be determined in response to the individual forces at the edges of the cover glass element, and a centroid location (x0, y0) can be determined based on a correlation between the individual forces. Thus, using two or more force-sensing structures, a total force Fz and central location (x0, y0) can be computed that correlates to the actual force exerted on the cover glass element. Additionally, signals generated by multiple force-sensing structures can be coupled with the output of a touch sensor (potentially integrated into the cover glass elements) to resolve both the location an magnitude (applied force) for multiple finger touches on a cover glass element.

Figure 7:
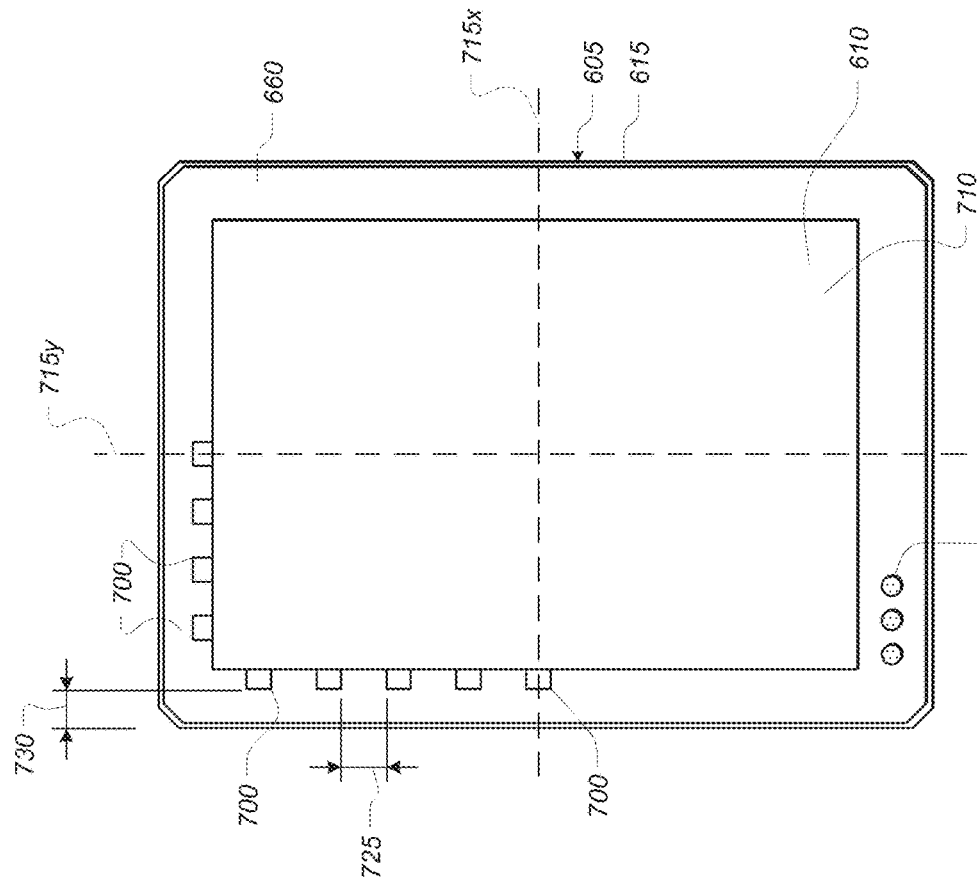
FIG. 7 depicts another embodiment of a touch device having a capacitive force sensor.

FIG. 7 depicts another exemplary embodiment of a device having a capacitive force sensor. The device may include a touch-sensitive region 710, which may (or may not) coincide with a display region such as an LED, LCD or OLED display. In this example, the touch-sensitive region 710 is formed from a transparent touch sensor integrated with the cover glass element 610.

FIG. 7 depicts, the touch device as viewed from above and includes the touch device case 605, the cover glass element 610, and the outer edge 615. The touch device also includes a home button 705, and a touch-sensitive region 710 (in which the touch device can determine a location of one or more touches using, for example, a capacitive touch sensor). The home button 705 may be partially or fully within the touch-sensitive region 710, or may be located outside the touch-sensitive region 710.

In one embodiment, the shape of the touch device can be indicated by a pair of centerlines 715, such as an X direction centerline 715x and a Y direction centerline 715y. The touch device can include, along one or more edges, such as bordering the touch-sensitive region 710, a set of force sensors 700. The force sensors 700 may be formed from one or more capacitive force sensors similar to those as described with respect to FIGS. 3-6. Alternatively, the force sensors 700 may include other devices capable of sensing applied force, such as a strain gauge.

As shown in FIG. 7, a device may include a plurality of force sensors 700 located along one or more edges of the perimeter of the touch-sensitive region 710. Each force sensor 700 includes at least two capacitive plates separated by a compressible intermediate layer. In one embodiment, the set of force sensors 700 can be disposed substantially outside a transparent portion of the touch-sensitive region 710. For example, the force sensors 700 may be located under an ink mask 660 (such as similar to or like that described with reference to the FIG. 6). In such cases, the force sensors 700 can be positioned with a gauge spacing 725 between pairs of the force sensors 700, and with an edge spacing 730 between individual ones of the force sensors 700 and an edge the touch device. In alternative embodiments, the force sensors 700 may be positioned beneath a display stack or located in another position with respect to the touch-sensitive region 710. The force sensors 700 may be evenly spaced from one another, spaced at uneven intervals, at repeating intervals, or as necessary. Likewise, the force sensors 700 may be positioned along all sides of the touch-sensitive region 710, at corners of the device, along less than all sides of the touch-sensitive region 710, or along a single edge of the touch-sensitive region 710. Accordingly, the sensor distribution shown in FIG. 7 is meant to be a sample, partial distribution and not limiting.

In one embodiment, each force sensor 700 is coupled to force-sensing circuitry that is configured to measure an amount of capacitance between a first flex circuit and a second flex circuit, which may be correlated to estimate a distance between the first flex circuit and the second flex circuit. The relative position of the first and second flex circuits may be similar to the configuration depicted in FIG. 6, discussed above. Similar to embodiments described above, an amount of capacitance between the first sensing element defined on the first flex circuit and the second sensing element defined on the second flex circuit can be detected and measured using force detection circuitry, which may include a processor. In such cases, the amount of applied force can be correlated to a relative change in distance between the first flex circuit and the second flex circuit, relative to a rest position when there is no force applied to the cover glass element 610. It should be appreciated that each force sensor 700 may be formed from first and second flex circuits, or may be a separate element.

In an alternative embodiment, each force sensor 700 is coupled to force-sensing circuitry that is configured to measure an amount of resistance between the first flex circuit and the second flex circuit. For example, the first and second flex circuits may be coupled by resistive layer. By measuring the resistance or change in resistance, the force-sensing circuitry can be used to determine a distance between the first flex circuit and the second flex circuit. For example, an amount of resistance between the first flex circuit and the second flex circuit can be correlated to a distance between the first flex circuit and the second flex circuit. This may occur when, for example the compressible, resistive layer is formed from a material that has a variable resistivity dependent on its thickness or an amount of compression. In one such case, the compressible, resistive layer includes a microstructure that has a resistance that increases like a spring force, similar to a strain gauge. The force-sensing circuitry may estimate the distance between the flex circuits by measuring the resistance or changes to the resistance in the compressible, resistive layer.

With reference to FIG. 7, the force sensors 700 can be operatively coupled to force-sensing circuitry (including a processor) that is configured to determine a set of distances (at distinct locations along the edge of the cover glass element 110) corresponding to the set of force sensors 700. That is, the force-sensing circuitry can estimate the distance between the first flex circuit and the second flex circuit based on the measured capacitance at each force sensor. In one embodiment, the displacements at each sensor 700 correlate to applied forces at the locations of those force sensors 700. Similar to the technique described above with respect to FIG. 6, a total force Fz can be determined based on an estimate of the individual forces, and a centroid location (x0, y0) can be determined based on a weighting of the estimate of the individual forces. In one embodiment, the total force Fz and the centroid location (x0, y0) is calibrated such that a set of computed forces and moments in response to the values of the total force Fz and the centroid location (x0, y0) best matches the observed values for displacements and forces at each of the set of force sensors 700. Thus, using multiple force sensors, a total force Fz and central location (x0, y0) can be computed that correlates to the actual force exerted device. Additionally, signals generated by multiple force sensors can be coupled with the output of a touch sensor (potentially integrated into the cover glass elements) to resolve both the location an magnitude (applied force) for multiple finger touches on the device.

Figure 8:
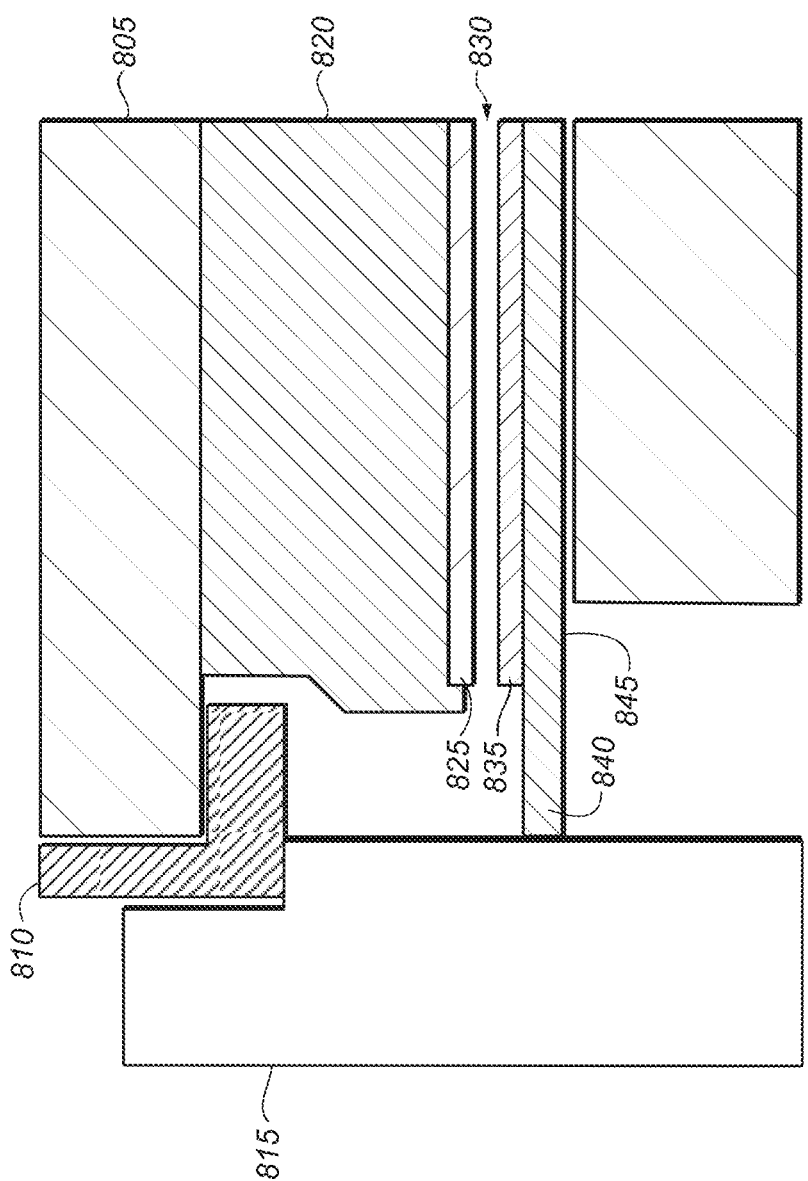
FIG. 8 depicts a cross sectional view of another embodiment of a touch device having a capacitive force sensor.

FIG. 8 depicts another exemplary embodiment of a device having a capacitive force sensor. In particular, the device depicted in FIG. 8 includes a cover glass element that is deformable.

As shown in FIG. 8, a cover glass element 805 can be coupled to a frame element 810, which can be coupled to a touch device frame 815. In one embodiment, there is a spatial separation between the cover glass element 805 and the frame element 810. For a first example, the cover glass element 805 can have a thickness of about 0.90 mm, although this particular thickness is merely exemplary and is not required. For a second example, the frame element 810 can include an elastomer, a plastic, or include construction from other substances. The cover glass element 805 can also be positioned above a display stack 820, such as a display stack from a touch device and adapted to provide a graphical or text display.

In one embodiment, the display stack 820 can be positioned above a reflector sheet 825 including an electrode pattern, such as can be used for drive and sense lines in a rectilinear capacitive array or individual sensor structures in an array. The reflector sheet 825 can be positioned above an air gap 830, such as can be used for capacitance between the reflector sheet 825 and another element. For example, the air gap 830 can have a thickness of about 0.10 mm, although this particular thickness is merely exemplary and is not required.

In one embodiment, the air gap 830 can be positioned above a circuit 835 having capacitive traces or elements, which may include a set of drive and sense traces/elements or be formed from an array of individual sensing traces/elements. For example, the circuit 835 can have a thickness of about 0.10 mm, although this particular thickness is merely exemplary and is not required.

In one embodiment, the circuit 835 can be positioned above a pressure sensitive adhesive (PSA) element 840. For example, the PSA element 840 can have a thickness of about 0.03 mm, although this particular thickness is merely exemplary and is not required.

In one embodiment, the PSA element 840 can be positioned above a midplate element 845. For a first example, the midplate element 845 can have a thickness of about 0.25 mm, although this particular thickness is merely exemplary and is not required. For a second example, the midplate element 845 can be supportive of the elements coupled thereto and below the air gap 830.

In one embodiment, the cover glass element 805, the display stack 820, and related elements can be relatively deformable. This can have the effect that applied force to the surface of the touch device can cause a change in distance between elements near the air gap 830, and a change in measured capacitance by circuits positioned near the air gap 830. For example, a set of drive and sense lines, or an array of individual sensing elements, could be positioned in the reflector sheet 825 or in the circuit 835, can measure a capacitance across the air gap 830.

In such cases, the capacitance across the air gap 830 would be subject to change in response to deformation of the cover glass element 805, the display stack 820, and related elements. This would have the effect that elements positioned near the air gap 830 would be able to measure the change in capacitance, and would be able to determine an amount or magnitude of an applied force in response thereto.

In some embodiments, multiple force sensors may be formed over the area of the cover glass element 805. In one embodiment, the set of force sensors can be positioned in a rectilinear array, such as an array in which each one of the force sensors is positioned at an [X, Y] location over the area of the cover glass element 805. For example, each one of the force sensors can include a capacitive force sensor exhibiting mutual capacitance between drive and sensor elements, or exhibiting self capacitance. In another example, each one of the sensors can include a resistive strain gauge exhibiting a change in resistance in response to applied force, such as a resistive strain gauge as described with respect to FIG. 6, above.

In one embodiment, the applied force can affect each force sensor that is substantially near the applied force. The applied force affects each such force sensor differently depending on an amount of the applied force and a distance between the [X, Y] location of the applied force and the [X, Y] location of the affected force sensor. This has the effect that a processor or other circuit in the touch device can determine a mapping of applied force, and in response thereto, a set of [X, Y] locations and a Z displacement of the cover glass element 805. For example, particular Z displacement of points along the edges of the cover glass element 805 (or within a touch-sensitive region) can be used to determine the [X, Y] location of the applied force. In one embodiment, the cover glass element 805 may be approximately 700 microns thick, although this thickness may vary between embodiments.

In one embodiment, the same or similar information can be used to determine the [X, Y] location and Z displacement of more than one such applied force. In such cases where multiple forces are applied, a processor or other circuit in the touch device can determine a centroid of applied force, from which the touch device can determine one or more individual forces. For example, from this information, a processor or other circuit can determine one or more [X, Y]

locations where force is being applied, and an amount or magnitude of force being applied at each such location.

In one embodiment, the interaction between the cover glass element 805 and the air gap 830 defines a set of forces at each location of applied force. A processor or other circuit in the touch device can measure these forces, such as using one or more capacitive sensing elements (as described herein) or using one or more strain gauges, distributed at locations throughout cover glass element 805. In response to those forces, the circuit can determine a set of normal vectors to the cover glass element 805 representing one or more locations of applied force and one or more amounts or magnitudes of the applied force.

In one embodiment, the locations of applied force can be determined in response to the distribution of sensed applied force at each location on the cover glass element 805, as described above, at each of the X and the Y locations, thus assigning each such location a Z amount of applied force. For a first example, a total centroid of applied force can be determined in response to the distribution of sensed applied force. The processor or other circuit can then locate each individual likely applied force, identify its amount of force, and subtract out that identified force from the sensed applied force at each location. This can have the effect of providing the processor or other circuit with a way to identify each applied force individually, until all such individual applied forces have been found.

In one embodiment, an amount or magnitude of force can be determined at each of a set of distinct locations at which a distinct force sensor is disposed below the cover glass element 805. For example, in one embodiment, the force sensors can be disposed in a grid below the cover glass element 805. Having the amount of force at each such location, a weighted centroid of that set of force amounts can be computed using a weighted sum of the locations at which each applied force is measured. Having determined such a centroid, the processor can determine a nearest local maximum force, either in response to the nearest maximum force sensor, or in response to a touch location sensor, or both. Having determined a nearest local maximum force, the processor can subtract that force and its expected effect on each force sensor, and repeat the process until each individual applied force is determined. In alternative embodiments, other and further techniques could be used in addition or instead.

4. FORCE-SENSITIVE DEVICE SYSTEM

Figure 9:
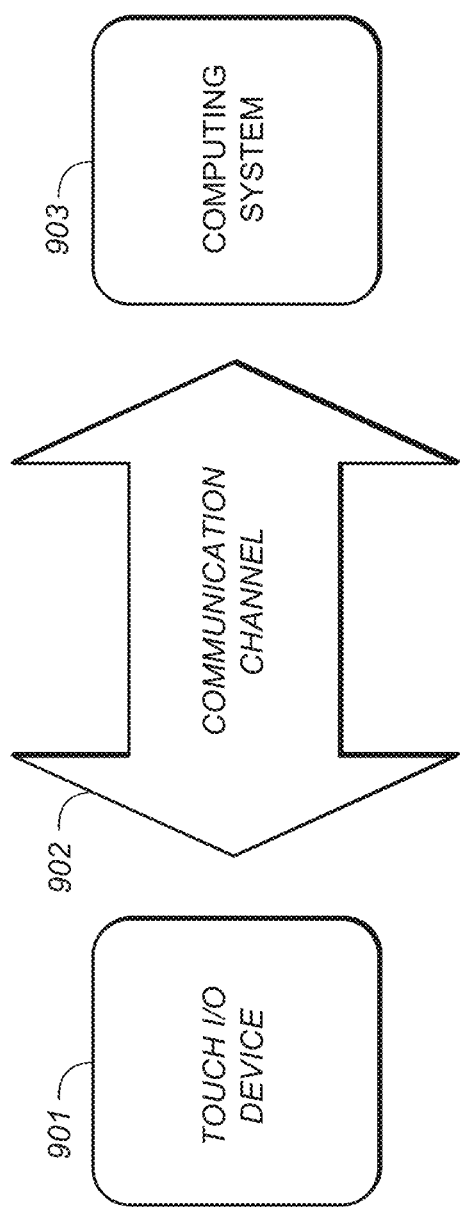
FIG. 9 depicts an exemplary communication between a touch I/O device and a computing system.

FIG. 9 depicts an exemplary communication between a touch I/O device and a computing system. In this example, the touch I/O device 901 includes one or more sensors for detecting a touch by an operator or user. The touch device 901 transmits electronic signals from the one or more sensors to a computing system 903 over a communication channel 902. An example computing system 903 is described below with respect to FIG. 10 and includes one or more computer processors and computer-readable memory for storing computer-executable instructions. The touch I/O device, communication channel 902 and computing system 903 may all be integrated together as a part of the same touch device.

As shown in FIG. 9, embodiments may include touch I/O device 901 that can receive touch input and force input (such as possibly including touch locations and applied force at those locations) for interacting with computing system 903 via wired or wireless communication channel 902. Touch I/O device 901 may be used to provide user input to computing system 903 in lieu of or in combination with other input devices such as a keyboard, mouse, or possibly other devices. In alternative embodiments, touch I/O device 901 may be used in conjunction with other input devices, such as in addition to or in lieu of a mouse, trackpad, or possibly another pointing device. One or more touch I/O devices 901 may be used for providing user input to computing system 903. Touch I/O device 901 may be an integral part of computing system 903 (e.g., touch screen on a laptop) or may be separate from computing system 903.

Touch I/O device 901 may include a touch sensitive and/or force sensitive panel which is wholly or partially transparent, semitransparent, non-transparent, opaque or any combination thereof. Touch I/O device 901 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 901 is a touch screen that may include a transparent and/or semitransparent touch-sensitive and force-sensitive panel at least partially or wholly positioned over at least a portion of a display. (Although, the touch sensitive and force sensitive panel is described as at least partially or wholly positioned over at least a portion of a display, in alternative embodiments, at least a portion of circuitry or other elements used in embodiments of the touch sensitive and force sensitive panel may be at least positioned partially or wholly positioned under at least a portion of a display, interleaved with circuits used with at least a portion of a display, or otherwise.) According to this embodiment, touch I/O device 901 functions to display graphical data transmitted from computing system 903 (and/or another source) and also functions to receive user input. In other embodiments, touch I/O device 901 may be embodied as an integrated touch screen where touch sensitive and force sensitive components/devices are integral with display components/devices. In still other embodiments a touch screen may be used as a supplemental or additional display screen for displaying supplemental or the same graphical data as a primary display and to receive touch input, including possibly touch locations and applied force at those locations.

Touch I/O device 901 may be configured to detect the location of one or more touches or near touches on device 901, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to the touch I/O device 901. Software, hardware, firmware or any combination thereof may be used to process the measurements of the detected touches, and where applicable, force of those touches, to identify and track one or more gestures. A gesture may correspond to stationary or non-stationary, single or multiple, touches or near touches, and where applicable, force of those touches, on touch I/O device 901. A gesture may be performed by moving one or more fingers or other objects in a particular manner on touch I/O device 901 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 903 may drive a display with graphical data to display a graphical user interface (GUI). The GUI may be configured to receive touch input, and where applicable, force of that touch input, via touch I/O device 901. Embodied as a touch screen, touch I/O device 901 may display the GUI. Alternatively, the GUI may be displayed on a display separate from touch I/O device 901. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 901 which may be associated with the graphical elements of the GUI. In other embodiments, the user may perform gestures at one or more locations that are independent of the locations of graphical elements of the GUI. Gestures performed on touch I/O device 901 may directly or indirectly manipulate, control, modify, move, actuate, initiate, or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 903 (e.g., affect a state or mode of a GUI, application, or operating system). Gestures may or may not be performed on touch I/O device 901 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 902 in response to or based on the touch or near touches, and where applicable, force of those touches, on touch I/O device 901. Feedback may be transmitted optically, mechanically, electrically, olfactory, acoustically, haptically, or the like or any combination thereof and in a variable or non-variable manner.

As previously mentioned, the touch I/O device, communication channel 902, and the computing system 903 may all be integrated into a touch device or other system. The touch device or system may be a portable or non-portable device, including, but not limited to, a communication device (e.g., mobile phone, smart phone), a multi-media device (e.g., MP3 player, TV, radio), a portable or handheld computer (e.g., tablet, netbook, laptop), a desktop computer, an all-in-one desktop, a peripheral device, or any other (portable or non-portable) system or device adaptable to the inclusion of system architecture depicted in FIG. 10, including combinations of two or more of these types of devices.

Figure 10:
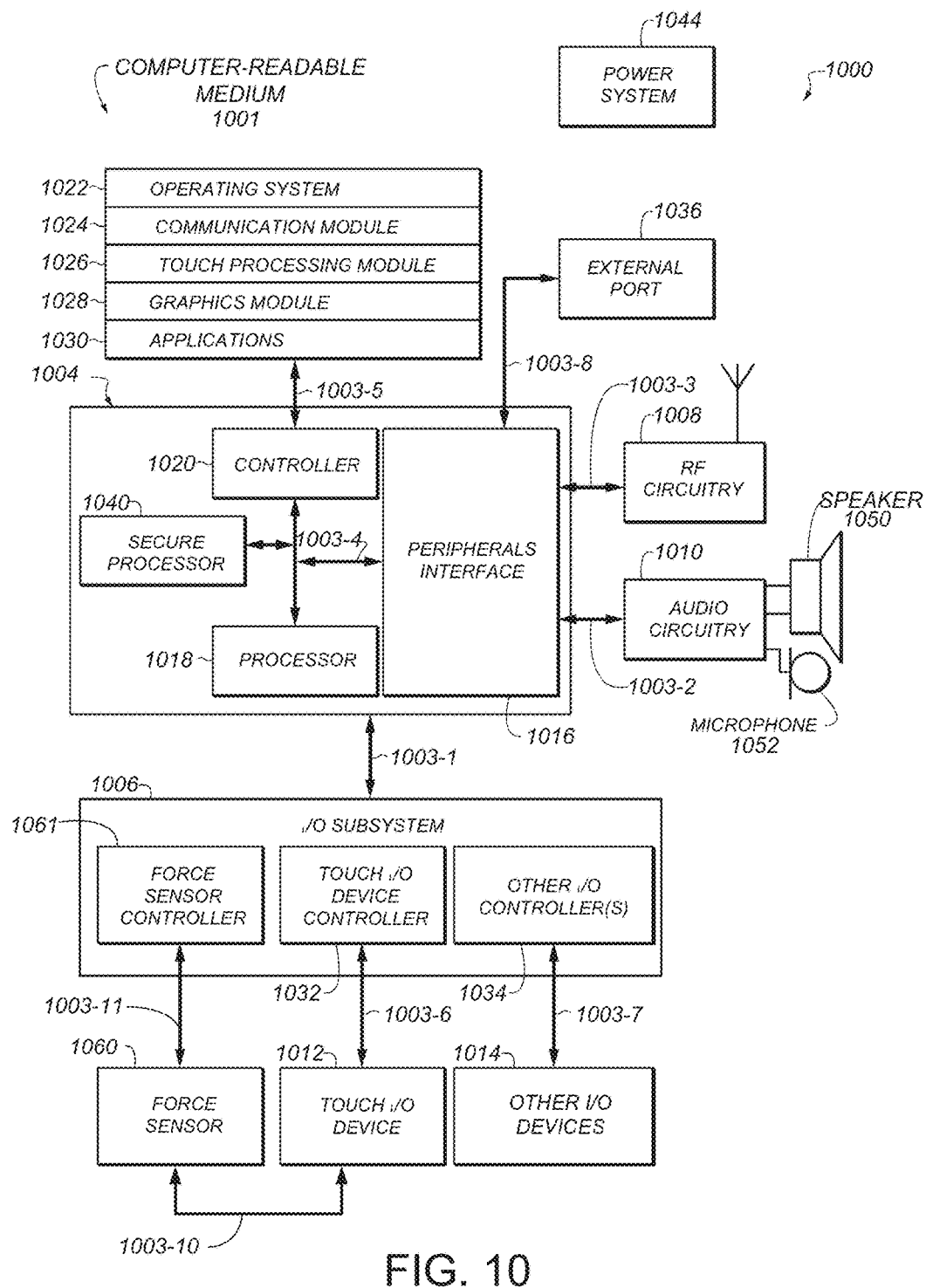
FIG. 10 depicts a schematic of a system including a force sensitive touch device.

FIG. 10 depicts a block diagram of one embodiment of system 1000 that generally includes one or more computer-readable media 1001, processing system 1004, Input/Output (I/O) subsystem 1006, electromagnetic frequency circuitry, such as possibly radio frequency (RF) or other frequency circuitry 1008 and audio circuitry 1010. These components may be coupled by one or more communication buses or signal lines 1003. Each such bus or signal line may be denoted in the form 1003-X, where X can be a unique number. The bus or signal line may carry data of the appropriate type between components; each bus or signal line may differ from other buses/lines, but may perform generally similar operations.

It should be apparent that the architecture shown in FIG. 10 is only one example architecture of system 1000, and that system 1000 could have more or fewer components than shown, or a different configuration of components. The various components shown in FIG. 10 can be implemented in hardware, software, firmware or any combination thereof, including one or more signal processing and/or application specific integrated circuits.

Shown in FIG. 10, RF circuitry 1008 is used to send and receive information over a wireless link or network to one or more other devices and includes well-known circuitry for performing this function. RF circuitry 1008 and audio circuitry 1010 are coupled to processing system 1004 via peripherals interface 1016. Interface 1016 includes various known components for establishing and maintaining communication between peripherals and processing system 1004. Audio circuitry 1010 is coupled to audio speaker 1050 and microphone 1052 and includes known circuitry for processing voice signals received from interface 1016 to enable a user to communicate in real-time with other users. In some embodiments, audio circuitry 1010 includes a headphone jack (not shown).

Peripherals interface 1016 couples the input and output peripherals of the system to processor 1018 and computer-readable media 1001. One or more processors 1018 communicate with one or more computer-readable mediums 1001 via controller 1020. Computer-readable medium 1001 can be any device or medium that can store code and/or data for use by one or more processors 1018. Medium 1001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 1018 run various software components stored on medium 1001 to perform various functions for system 1000. In some embodiments, the software components include operating system 1022, communication module (or set of instructions) 1024, touch and applied force processing module (or set of instructions) 1026, graphics module (or set of instructions) 1028, and one or more applications (or set of instructions) 1030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1001 may store a subset of the modules and data structures identified above. Furthermore, medium 1001 may store additional modules and data structures not described above.

Operating system 1022 includes various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via RF circuitry 1008 and includes various software components for handling data received from RF circuitry 1008 and/or external port 1036.

Graphics module 1028 includes various known software components for rendering, animating and displaying graphical objects on a display surface. In embodiments in which touch I/O device 1012 is a touch sensitive and force sensitive display (e.g., touch screen), graphics module 1028 includes components for rendering, displaying, and animating objects on the touch sensitive and force sensitive display.

One or more applications 1030 can include any applications installed on system 1000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

Touch processing module 1026 includes various software components for performing various tasks associated with touch I/O device 1012 including but not limited to receiving and processing touch input and applied force input received from I/O device 1012 via touch I/O device controller 1032. In some cases, the touch processing module 1026 includes computer instructions for operating the force sensor 1060. For example, the touch processing module 1026 may include instructions for performing one or more operations described below with respect to processes 1100 and 1150 of FIGS. 11A-B. In some cases, the touch processing module 1026 includes parameters or settings that may be implemented in the operation of the force sensor 1060.

I/O subsystem 1006 is coupled to touch I/O device 1012 and one or more other I/O devices 1014 for controlling or performing various functions. Touch I/O device 1012 communicates with processing system 1004 via touch I/O device controller 1032, which includes various components for processing user touch input and applied force input (e.g., scanning hardware). One or more other input controllers 1034 receives/sends electrical signals from/to other I/O devices 1014. Other I/O devices 1014 may include physical buttons, dials, slider switches, sticks, keyboards, touch pads, additional display screens, or any combination thereof.

If embodied as a touch screen, touch I/O device 1012 displays visual output to the user in a GUI. The visual output may include text, graphics, video, and any combination thereof. Some or all of the visual output may correspond to user-interface objects. Touch I/O device 1012 forms a touch-sensitive and force-sensitive surface that accepts touch input and applied force input from the user. Touch I/O device 1012 and touch screen controller 1032 (along with any associated modules and/or sets of instructions in medium 1001) detects and tracks touches or near touches, and where applicable, force of those touches (and any movement or release of the touch, and any change in the force of the touch) on touch I/O device 1012 and converts the detected touch input and applied force input into interaction with graphical objects, such as one or more user-interface objects. In the case in which device 1012 is embodied as a touch screen, the user can directly interact with graphical objects that are displayed on the touch screen. Alternatively, in the case in which device 1012 is embodied as a touch device other than a touch screen (e.g., a touch pad or trackpad), the user may indirectly interact with graphical objects that are displayed on a separate display screen embodied as another I/O device 1014.

In embodiments in which touch I/O device 1012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch, and applied force, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1000 also includes power system 1044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1016, one or more processors 1018, and memory controller 1020 may be implemented on a single chip, such as processing system 1004. In some other embodiments, they may be implemented on separate chips.

In one embodiment, an example system includes a force sensor 1060 integrated with the touch I/O device 2012. The force sensor 1060 may include one or more of the force-sensitive structures described above with respect to any one of the example embodiments. Generally, the force sensor 1060 is configured to generate an electronic signal or response that can be interpreted or processed as a magnitude of force of a touch on touch O/I device 1012. In some cases, the force sensor 1060 transmits electronic signals directly to the touch I/O device via signal line 1003-10. The signals may be relayed to the force sensor controller 1061 in the I/O subsystem 1006. In some cases, the force sensor 1060 transmits signals directly to the force sensor controller 1061 via signal line 1003-11 without passing through the touch I/O device 1012.

The force sensor controller 1061 either alone or in combination with one or more of the processors (e.g., processor 1018 or secure processor 1040) may serve as the force sensing circuitry for the force sensor 1060. In particular, the force sensor controller 1061 can be coupled to a processor or other computing device, such as the processor 1018 or the secure processor 1040. In one example, the force sensor controller 1061 is configured to calculate and estimated force based on electronic signals generated by the force sensor 1060. Data regarding estimated force may be transmitted to the processor 1018 or secure processor 1040 for use with other aspects of the system 1000, such as the touch processing module 1026. In one example, the force sensor controller 1061 performs signal processing on the electronic signal that is produced by the force sensor 1060, including, for example, analog to digital conversion, filtering, and sampling operations. In some cases, other processors in the system 1000 (e.g., processor 1018 or secure processor 1040) that calculate an estimated force based on the processed signal. As a result, the system 1000 can utilize signals or data produced by the force sensor controller 1061, which can be measured, calculated, computed, or otherwise manipulated. In one embodiment, the output of the force sensor 1060 be used by one or more processors or other computing devices, coupled to or accessible to the force sense controller 1061 or the touch I/O device, such as the processor 1018, the secure processor 1040, or otherwise. Additionally, output from the force sensor 1060 can be used by one or more analog circuits or other specialized circuits, coupled to or accessible to the force sensor controller 1061 or the touch I/O device 1012.

After reading this application, those skilled in the art would recognize that techniques for obtaining information with respect to applied force and contact on a touch I/O device, and using that associated information to determine the magnitude and locations of applied force and contact on a touch I/O device, is responsive to, and transformative of, real-world data such as attenuated reflection and capacitive sensor data received from applied force or contact by a user's finger, and provides a useful and tangible result in the service of detecting and using applied force and contact with a touch I/O device. Moreover, after reading this application, those skilled in the art would recognize that processing of applied force and contact sensor information by a computing device includes substantial computer control and programming, involves substantial records of applied force and contact sensor information, and involves interaction with applied force and contact sensor hardware and optionally a user interface for use of applied force and contact sensor information.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

5. METHODS OF OPERATION

Figure 11A:
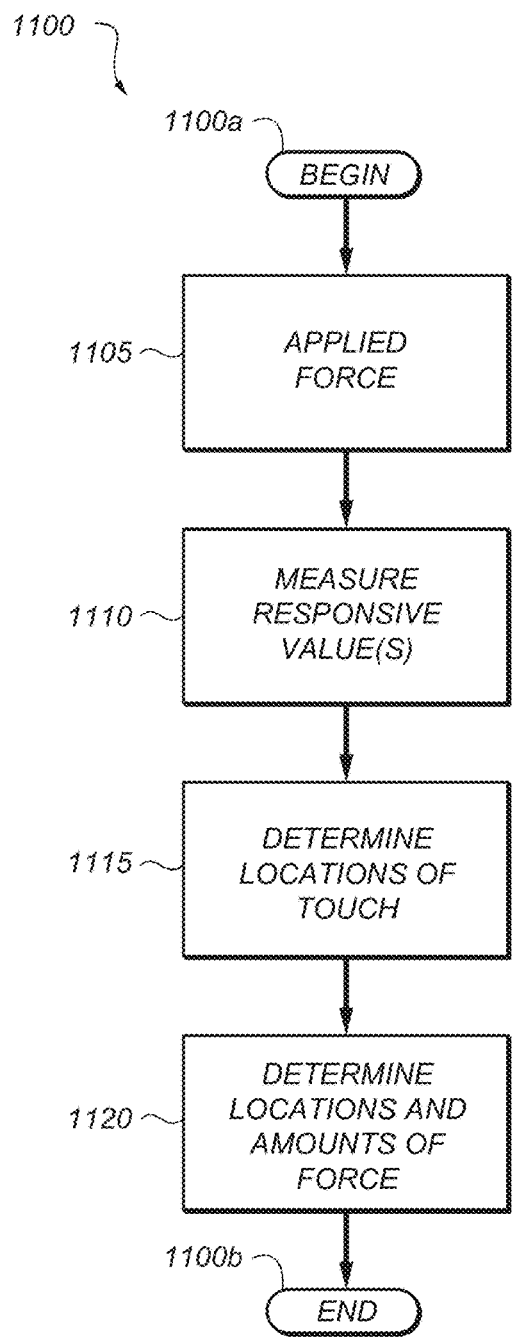
FIG. 11A depicts an example method of operation.

FIG. 11A depicts an exemplary process for operating a device having a force sensor. The process may be applied using the force sensors described above with respect to FIGS. 2A, 2B, 3-8, discussed above.

FIG. 11A depicts an exemplary flow chart for a process 1100 that includes flow points and operational steps or functions. Although these flow points and operations are shown in a particular order, in the context of a more generalized technique, there is no particular requirement that the order of the operations must be followed as shown. For example, the flow points and operations could be performed in a different order, concurrently, in parallel, or otherwise. Similarly, although these flow points and operations are shown performed by a general purpose processor in a device, in the context of a more generalized approach, there is no particular requirement for any such limitation. For example, one or more such operations could be performed by a special purpose processor, by another circuit, or be offloaded to other processors or other circuits in other devices, such as by offloading those functions to nearby devices using wireless technology or by offloading those functions to cloud computing functions.

At a flow point 1100a, the process 1100 is ready to begin. Typically, the electronic device has been turned on and the operating system has been loaded and is running. Also, the relevant hardware including, for example, touch screen sensors, display devices, and force sensor devices have been powered and may have been initialized.

At operation 1105, a force is applied to a location [X, Y] on the cover glass of the device. The force may be applied using either a finger or another pointing devices, such as a stylus or pen. In some cases, multiple touches may be applied to the cover glass of the device. For example, a multi-touch gesture or command may be input on the cover glass resulting in a net applied force.

At operation 1110, an electrical signal is detected and measured in response to the applied force. In one example, force-sensing circuit (which may include a processor) in the device measures a value from one or more force sensors in response to the applied force. In one embodiment, as described above with respect to FIGS. 2A, 2B, and 3-5, a force-sensing circuit detects a change in the capacitance at one or more force-sensing structures. The change in capacitance may be correlated or used to estimate a deflection in the cover glass resulting from the applied force. In another embodiment, as described with respect to FIG. 6, the force-sensing circuit estimates an amount of tilt applied to the cover glass based on a signal or signals received from one or more force sensors. In yet another embodiment, as described with respect to FIG. 7, the force-sensing circuit is used to detect a change in capacitance between capacitive sensors (or with respect to a single sensor, in a self-capacitance mode) at a set of distinct locations below the cover glass. The change in capacitance can be used to estimate the displacement on the cover glass resulting from the applied force.

At operation 1115, the location of the one or more touches is determined. In one example, the force-sensing circuit determines one or more locations at which the force is being applied to the cover glass element based on the signal or signals received from one or more force sensors. The location may be determined by, for example, comparing the output from multiple force sensors and using the output to triangulate or estimate a location of the applied force.

At operation 1120, the amount or magnitude of the force being applied at each location is estimated. For example, the force-sensing circuit may be used to determine an amount or magnitude of force being applied at each measured location, such as using the weighted centroid technique described with respect to the FIG. 8.

At a flow point 1100b, the process 1100 is completed. In one embodiment, the method 1100 is repeated so long as the force sensitive device is powered on.

Figure 11B:
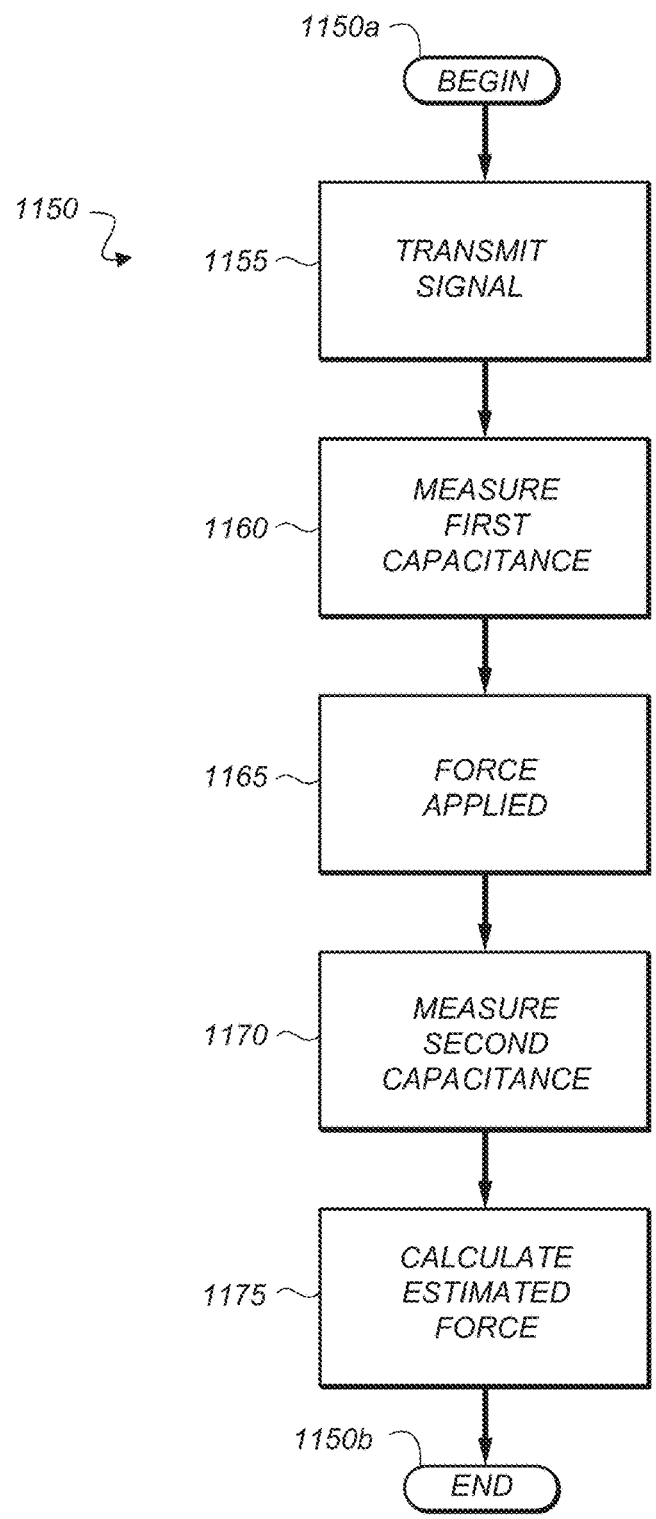
FIG. 11B depicts another example method of operation.

FIG. 11B depicts another process for operating a device having a force sensor. The process may be applied using the force sensors described above with respect to FIGS. 2A, 2B, 3-8, discussed above.

FIG. 11B depicts another exemplary flow chart for a process 1150 that includes flow points and operational steps or functions. Although these flow points and operations are shown in a particular order, in the context of a more generalized technique, there is no particular requirement that the order of the operations must be followed as shown. Similarly, although these flow points and operations are shown performed by a general purpose processor in a device, in the context of a more generalized approach, there is no particular requirement for any such limitation.

At a flow point 1150a, the process 1150 is ready to begin. Typically, the electronic device has been turned on and the operating system has been loaded and is running. Also, the relevant hardware including, for example, touch screen sensors, display devices, and force sensor devices have been powered and may have been initialized.

At operation 1155, a charge signal is transmitted to a force-sensitive structure. In a typical implementation, the charge signal includes a series of charge pulses is transmitted to one of the capacitive plates in a force-sensitive structure. Each charge pulse comprises a momentary change in the voltage applied to the capacitive plates of the force-sensitive structure resulting in an induced current across the plates. In some instances, the charge signal is an alternating current (AC) that is applied across the capacitive plates of the force-sensing structure. In many cases, if the charge signal is a discrete charge pulse, the charge pulse is transmitted at regular intervals during the operation of the device. If the charge signal is an alternating current, the charge signal may be transmitted continuously during operation. In either case, operation 1155 is typically performed simultaneously with operations 1160, 1165, and 1170, described below.

At operation 1160, a first capacitance is measured for the force-sensitive structure. Typically, the capacitance is measured while the force-sensitive structure is in an uncompressed or unactuated state. For example, the measurement of operation 1160 may be taken when the device is stationary and is not being touched by an operator. In some cases, multiple measurements are taken over a period of time and a composite or average capacitance value is determined.

At operation 1165, a force is applied to the device. In accordance with the embodiments described above with respect to FIGS. 2A, 2B, 3-8, a user may touch the cover glass of a device applying a force at a location on the cover glass. The user may touch the device with a finger, stylus, pen, or the like. In some cases, multiple touches are applied to the cover glass at the same time in accordance with a multi-touch gesture or user input. In accordance with the embodiments described above with respect to FIGS. 2A, 2B, 3-8, an applied force typically results in the compression or deflection of a force-sensitive structure resulting in a relative change in position of the two capacitive plates.

At operation 1170, a second capacitance is measured for the force-sensitive structure. Typically, the capacitance is measured while the force-sensitive structure is in a compressed or deflected state due to the force applied in operation 1165, described above. In some cases, multiple measurements are taken over a period of time and a composite or representative capacitance value is determined.

At operation 1175, a force is estimated using the first and second capacitance measurements. In accordance with the embodiments described above with respect to FIGS. 2A, 2B, 3-8, an applied force results in a change in the position of the two capacitive plates, thus changing the capacitance of the force-sensitive structure. In operation 1175, the change in capacitance is correlated with or used to compute an estimated force. For example, if compressible element of a force-sensitive structure behaves as a linear force spring, the change in capacitance (which is proportional to the change in distance between the capacitive plates) will be proportional to the change in force. Because the material properties, such as the spring rate, of the compressible element are known the amount of force can be estimated as the difference between the first and second capacitance measurements multiplied by a constant.

At a flow point 1150b, the process 1150 is completed. In one embodiment, the method 1150 is repeated so long as the force sensitive device is powered on.

6. ELECTRICAL CONNECTION TO A FORCE SENSOR AND METHOD OF MANUFACTURING

In accordance with certain embodiments described above, a capacitive force sensor typically includes a force-sensitive structure having two capacitive plates separated by an intermediate, compressible element. In a typical implementation, a charge signal is applied to at least one of the capacitive plates and a capacitive measurement is taken. To deliver both the charge signal (drive signal) and receive the capacitive measurement (sense signal) from the capacitive plates, the force-sensitive structure is typically connected to other elements of the system by an electrical connection. To facilitate assembly during manufacturing, it may be advantageous that the electrical connection be a detachable electrical connection formed from a flexible conduit.

Figure 12:
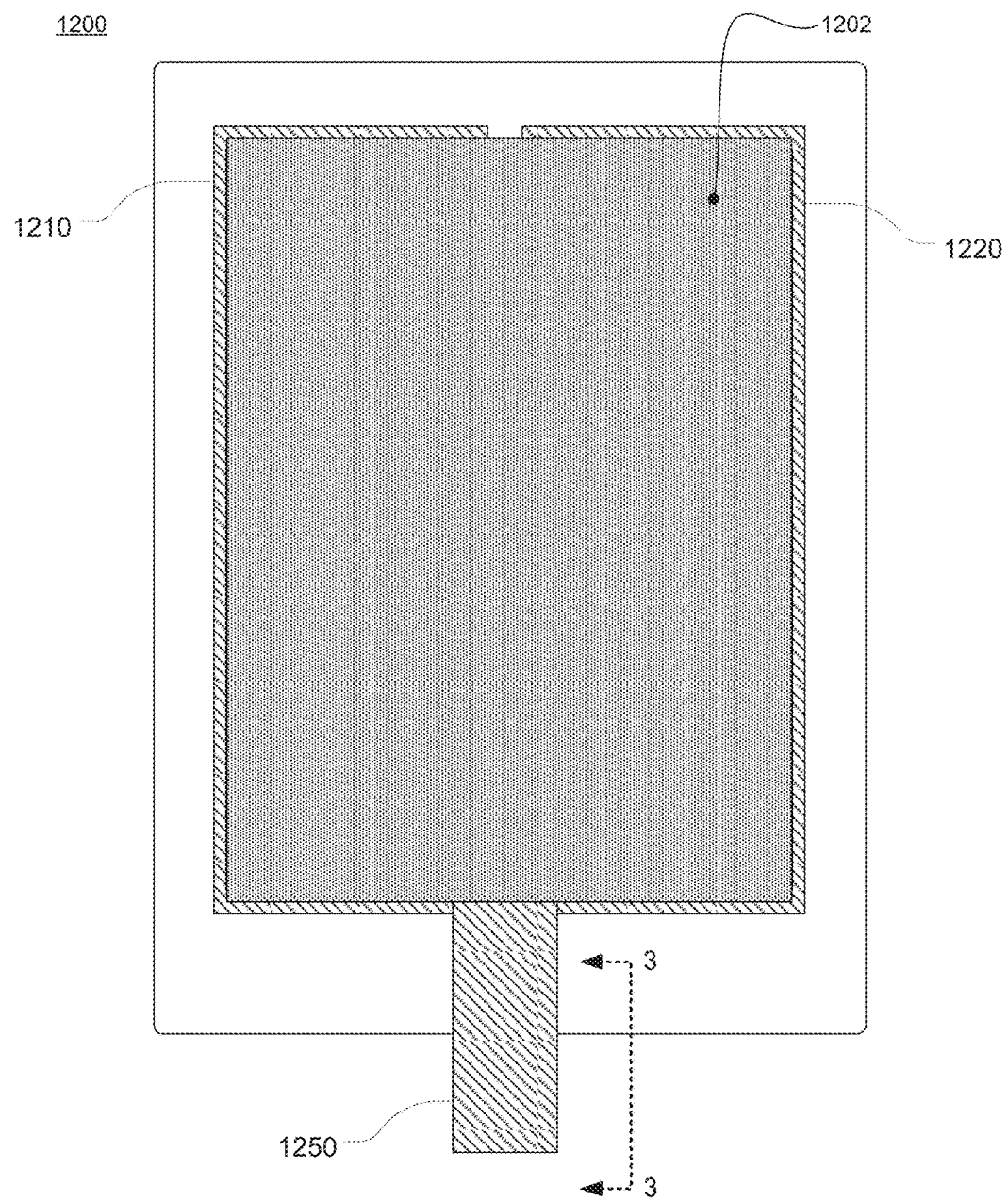
FIG. 12 depicts a force-sensitive structure having an electrical connector tail.

FIG. 12 depicts an example touch device 1200 having two force-sensing structures 1210, 1220 located around the perimeter of a display element 1202 or a portion thereof. The two force-sensing structures 1210, 1220 are electrically connected to an electrical connector tail 1250. In this example, each of the two force-sensing structures (1210, 1220) is formed from a first and second capacitive plate separated by an intermediate, compressible element. Generally, the force-sensing structures 1210 and 1220 can be used to determine a magnitude of a touch on a surface of the device. As explained above with respect to FIGS. 3-5, a force applied to the device compresses or deforms the compressible element, changing the distance between the first and second capacitive plates. The change in distance can be measured as a change in capacitance between the two plates using force-sensing circuitry.

The electrical connector tail 1250 can be used to electrically couple the two force-sensing structures 1210, 1220 with the force-sensing circuitry, which may be located on a separate circuit component within the device. In some cases, it may be advantageous that the electrical connector tail 1250 is formed from a flexible conduit to facilitate connection with the force-sensing circuitry. For example, the electrical connector tail 1250 may be formed from a laminate of polyimide materials that have been printed or formed with electrical conductive traces. In some cases, it may be further advantageous that the flexible conduit be configured to bend easily to facilitate routing within the limited space of the device enclosure. To improve the flexibility or bend radius of the connector tail 1250, it may be advantageous to eliminate or remove the intermediate, compressible element in at least an end portion of the connector tail 1250. Removing the intermediate, compressible element may also facilitate electrical connection with one or more internal surfaces of the electrical connector tail 1250.

Figure 13:
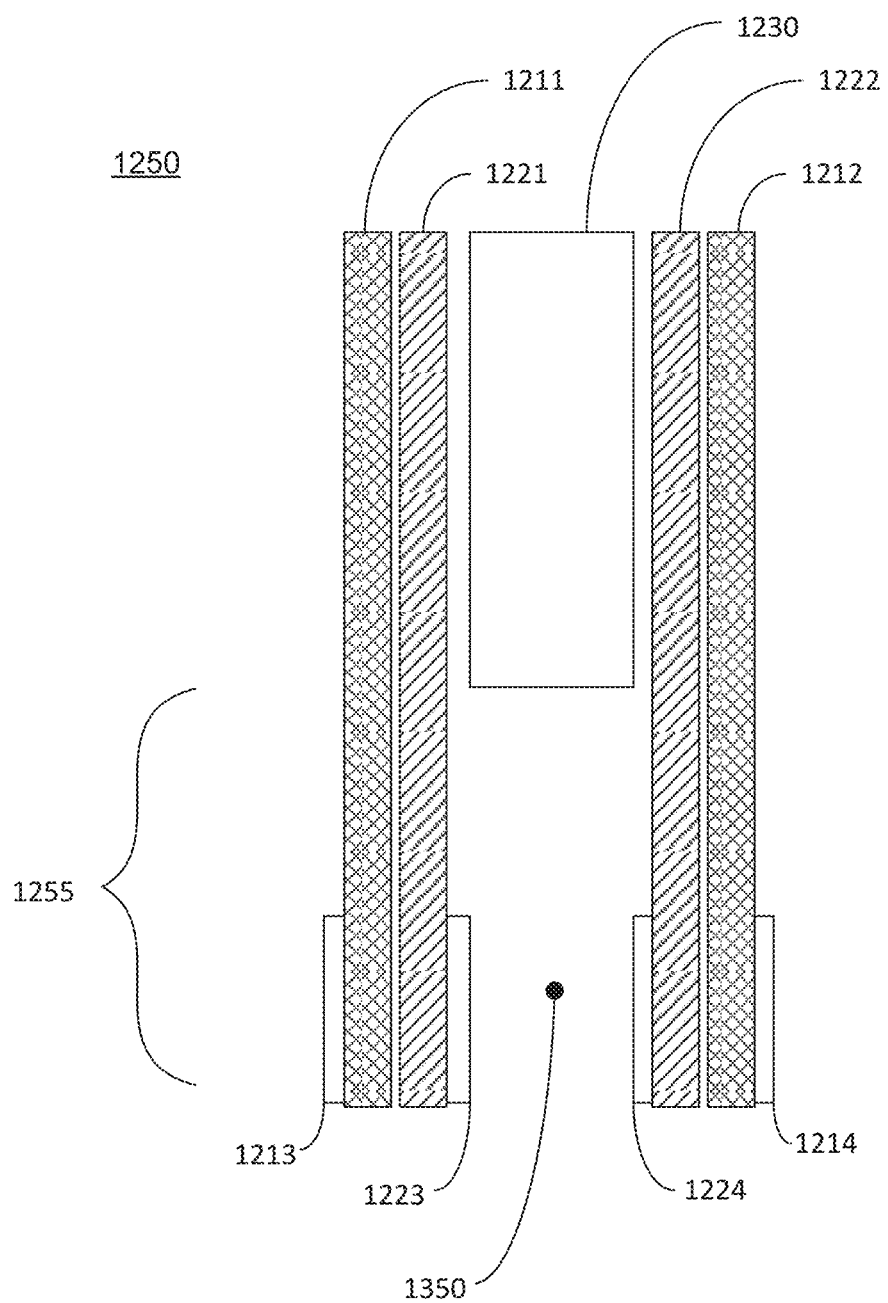
FIG. 13 depicts a cross-sectional view of an electrical connector tail.

FIG. 13 depicts a cross-sectional view along line 3-3 of the electrical connector tail 1250. As shown in FIG. 13, the electrical connector tail 1250 is formed from four circuit layers 1211, 1212, 1221, 1222. In this example, each of the circuit layers includes at least one flexible dielectric layer and at least one flexible conductive layer. The flexible dielectric layer may be formed from a polyimide sheet and the electrical conductive layer may be formed from a metal film or metallized trace material. Further, in this example, each of the circuit layers is electrically connected with a capacitive plate of one of the force-sensitive structures 1210, 1220 (depicted in FIG. 12). For example, the electrical conductive layer of circuit layer 1211 may be electrically connected to a first (upper) capacitive plate of the force-sensitive structure 1210. Similarly, the electrical conductive layer of circuit layer 1212 may be electrically connected to a second (lower) capacitive plate of the force-sensitive structure 1210. Similarly, the circuit layers 1221 and 1222 are electrically connected to a first (upper) and a second (lower) capacitive plate, respectively, of the force sensitive structure 1220. In this example, each of the circuit layers 1211, 1221, 1222, and 1212 are electrically coupled to a respective terminal 1213, 1223, 1224, and 1214.

Alternatively, one or more of the circuit layers 1211, 1221, 1222, and 1212 may serve as a ground layer for the force-sensitive structure 1210. In one example either of both of the outer circuit layers 1211 or 1212 are held at a constant voltage during the operation of the sensor to act as an electromagnetic shield. In some cases, the outer circuit layers 1211 or 1212 are connected to ground during the operation of the sensor to facilitate electromagnetic shielding. One or more of the outer circuit layers may serve as ground shield, depending on the location of the source of the interference. In some cases, one or more additional ground shield circuit layers are added to the force-sensitive structure. These additional ground shield layers may be added, for example, to the outer surfaces of the outer circuit layers 1211 and 1212. In one example, the conductive traces in any ground shield layer may extent substantially across the entire surface of the circuit layer to maximize the area that is shielded by the ground shield layer.

As shown in FIG. 13, the two circuit layers 1211 and 1221 are separated from the other two circuit layers 1212, and 1222 by the intermediate compressible layer 1230. In this example, the compressible layer 1230 serves as the compressible element in the force sensors 1210, 1220. As also shown in FIG. 13, the compressible layer 1230 does not extend into an end portion 1255 of the electrical connector tail 1250. As shown in FIG. 13, a void region 1350 is formed between the pairs of circuit layers.

As explained above, this configuration may be advantageous from a few aspects. First, because there is no material connection the upper and lower pairs of circuit layers, the bendability of the electrical connector tail 1250 is improved, which may facilitate a smaller bending radius. Additionally, because there is no material between the pairs of circuit layers, additional, internal electrical terminals 1223 and 1224 may be used for electrical connections. This reduces the need for circuit vias or additional electrical routing that may otherwise be required to electrically connect the electrical conductive layers of internal circuit layers 1221, 1222 to an external terminal.

While the device 1200 depicted in FIG. 12 includes two force-sensing structures located around the periphery of a display element 1202, an alternative embodiment may include only a single force-sensing structure. In this case, the electrical connector tail may only include two conductive layers (on two circuit layers). In other alternative embodiments, a device may include more than two force-sensing structures and the electrical connector tail may have multiple conductive layers to facilitate connection with each of the force-sensing structures.

Figure 14:
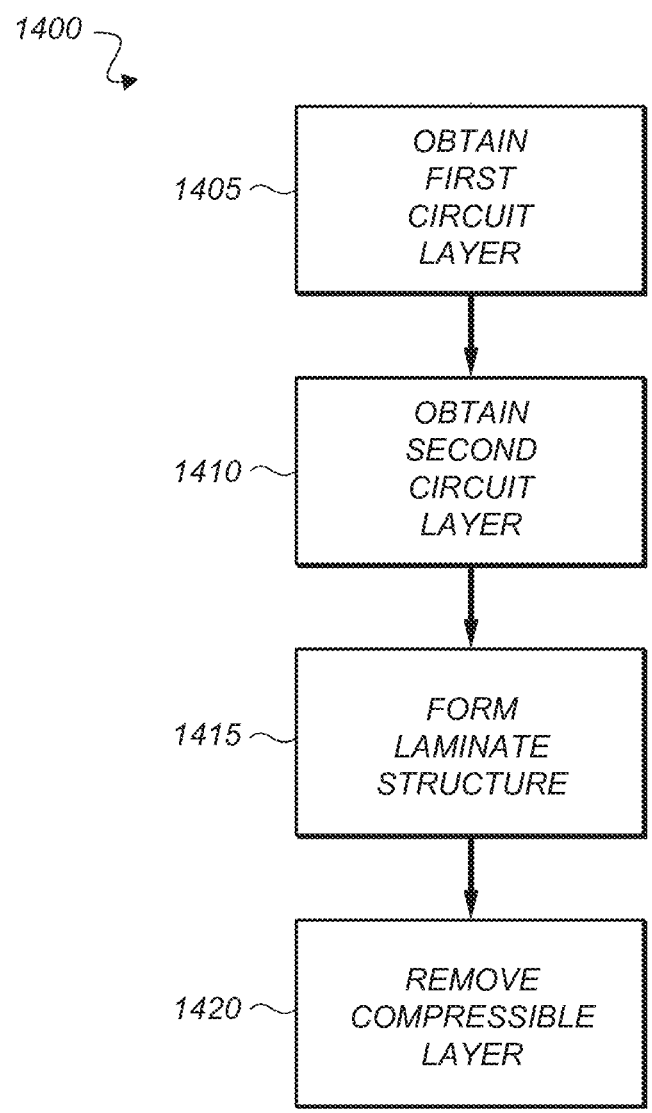
FIG. 14 depicts an example method of manufacturing a force-sensitive structure having an electrical connector tail.

FIG. 14 depicts an example process 1400 for manufacturing a force sensor having an electrical connector tail. The process 1400 can be used to manufacture the force sensors 1210, 1220 having an electrical connector tail 1250 in accordance with the embodiments of FIGS. 12 and 13. The process 1400 may also be used to manufacture force sensors having a variety of configurations, including configurations having a single pair of conductive layers.

In operation 1405, a first circuit layer is obtained. In this example, the first circuit layer comprises at least a first flexible conductive layer and a first flexible dielectric layer. With reference to FIG. 13, the first circuit layer may include one of either of the circuit layers pairs 1211, 1221 or 1222, 1212. In some cases, the first circuit layer may be obtained by forming the first conductive layer on the first dielectric layer. The conductive layer may be formed by, for example, bonding a metal foil to a surface of the first dielectric layer. In some cases, the conductive layer may be formed by a deposition or sputtering process that deposits a conductive material onto the dielectric layer. In one example, the conductive layer also forms one or more of the capacitive plates used for the force sensor. In some cases, the first circuit layer is pre-manufactured and obtained as a sheet or die-cut component.

In operation 1410, a second circuit layer is obtained. In this example, the second circuit layer also comprises at least a second flexible conductive layer and a second flexible dielectric layer. With reference to FIG. 13, the second circuit layer may also include one of either circuit layer pairs 1211, 1221 or 1222, 1212 (that is also separated from the first circuit layer by the intermediate compressible layer 1230). As described above, the first circuit layer may be obtained by forming the first conductive layer on the first dielectric layer by laminating a metal foil or depositing a conductive material onto a surface of the dielectric layer. The second circuit layer may also be pre-manufactured as a sheet or die-cut component.

In operation 1415, a laminate structure is formed. In particular, a laminate structure is formed such that the compressible layer is disposed between the first and second circuit layers. With reference to FIG. 13, an exemplary laminate structure includes the four circuit layers 1211, 1221, 1222, 1212 and the compressible layer 1230. In many cases, other layers are formed as part of the laminate structure. For example, additional circuit layers, adhesive layers, and coatings may be formed as part of the laminate structure. In particular, an adhesive layer is typically used to bond the intermediate compressible layer with the other, adjacent components of the laminate structure. It is not necessary that either the first or second circuit layers (obtained in operations 1405 and 1410) be immediately adjacent or bonded directly to the compressible layer.

Operation 1415 may be performed by, for example, placing pressure sensitive adhesive (PSA) layers between the components of the laminate structure. The laminate may then be subjected to a pressing operation to bond the layers. In some cases, heat or other curing techniques may be employed to bond the layers together.

Operation 1415 may also be performed using an injection or insertion molding process. In this case, the first and second circuit layers may be laminated or pre-formed with other layers or components. The layers may then be placed in opposite halves of an injection mold cavity and the intermediate compressible layer may be formed between the layers by injecting a molten or liquid material into the injection mold. In one example, a spacer element is placed between the first in second circuit layers to hold the first and second circuit layers against the respective halves of the injection mold. The spacer element may be approximately the same thickness as the final dimension of the compressible layer. In one example, the spacer element is compressible and is slightly larger than the final dimension of the compressible layer to be injection molded between the first and second circuit layers. In this case, the spacer element exerts a force against the first and second circuit layers, which are pressed against respective cavity walls of the injection mold. By pressing the circuit layers against the cavity walls, the injected molded material is more likely to fill the area between the circuit layers rather than filling an area between the circuit layers and the cavity walls. In one example, multiple spacer elements are used, each spacer element formed from a semi-circular ring. The spacer elements may be placed near the injection point of the mold, which is typically near the center of the part. The spacer elements can then be removed by die-cutting the center portion of the part, which may also facilitate the creation of a viewing area for the display.

As part of operation 1415, one or more electrical vias may be formed between the various layers of the laminate structure. In some cases, electrical vias are formed through the compressible layer to connect circuit layers that are disposed on opposite sides of the compressible layer. The vias may be formed by, for example, the addition of conductive pillar elements that electrically connect the conductive layers of different circuit layers. Additionally or alternatively, conductive regions within the compressible layer may be formed and then reflowed or otherwise electrically connected with conductive layers of the laminate structure.

In some cases, the laminate structure that is formed in operation 1415 is cut to form the force sensor having an electrical connector tail. For example, if the first and second circuit layers (obtained in operations 1405 and 1410) are formed as a solid sheet of material, the laminate structure may be die cut to form the desired geometric profile features of the force sensor. Specifically, a center portion may be cut out of the middle of the laminate structure to facilitate installation with a display element. Thus, the display element will be visible through the hole created in the middle of the laminate structure. As mentioned above, if the laminate structure includes spacer elements used for an injection molding process, they may be removed by this die cutting operation. Additional cuts may be performed to form the connector tail portion of the force sensor.

The cutting operation may be optional if, for example, the first and second circuit layers (obtained in operations 1405 and 1410) have been pre-cut or have been formed in the desired geometric profile shape. In this case, operation 1415 may also include an indexing operation to align the layers of the laminate structure.

In operation 1420, a portion of the compressible layer is removed from the laminate structure. In this example, a portion of the compressible layer located in an end portion of electrical connector tail is removed from the laminate structure leaving a void region between the first and second circuit elements. As explained above with respect to FIGS. 12 and 13, removal of the compressible layer may improve the flexibility or bendability of the laminate structure. It may also provide access to terminals or electrical connections on circuit layers that are internal to the laminate structure.

Removing the compressible layer may be accomplished using one or more techniques. In a first example, the compressible layer is perforated or pre-cut near the end portion of the electrical connector tail. Also, within the end portion of the electrical connector tail, the pressure sensitive adhesive or other bonding layer may be omitted between the compressible layer and the adjacent layers of the laminate structure. In this case, the pre-cut or perforation and the absence of a bonding layer allows the portion of the compressible layer in the end portion of the electrical connector tail to be removed.

In a second example, one or more layers of the laminate structure are delaminated or stripped from the compressible layer exposing the compressible layer. In this case, as secondary cut operation may be performed to remove the portion of the compressible layer in the end portion of the electrical connector tail.

In a third example, the compressible layer may be cut from the end portion of the electrical connector tail without first delaminating or stripping layers of the laminate structure. For example, the portion of the compressible layer within the end portion of the connector tail may be removed by passing a knife or cutting implement between the layers of the laminate structure.

As an alternative to operation 1420, the laminate structure may be formed such that the end portion of the electrical connector tail does not include the compressible layer. For example, if the laminate structure is formed using an injection or insertion molding process, an insert mold element may be placed in the end portion of the electrical connector tail preventing the formation of a compressible layer in this region. In this case, the laminate structure is formed with a void region between the first and second circuit layers.

As described above, the process 1400 may also be used to manufacture force sensors having a variety of configurations, including configurations having a single pair of conductive layers. For example, a force sensor having only two circuit layers (one on each side of the intermediate compressible layer) may be formed using process 1400. Alternatively, a force sensor having multiple circuit layers formed on either side of the intermediate compressible layer may also be formed using process 1400.

The operations of process 1400 are provided as one example. However, a force sensor may also be formed by omitting one or more of the operations described above. For example, depending on how the laminate structure is created, it may not be necessary to perform operation 1420 to remove a portion of the compressible layer.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. An electronic device comprising:
    a cover glass;
    a touch sensor comprising one or more arrays of conductive lines integrated with the cover glass and configured to detect a location of a touch on the cover glass;
    a force-sensing structure disposed at a periphery of the touch sensor, wherein the force-sensing structure comprises:
        a first layer of polyimide flex material;
        a first capacitive plate on the first layer of polyimide flex material;
        a second layer of polyimide flex material;
        a second capacitive plate disposed on the second layer of polyimide flex material; and
        a compressible dielectric element disposed between the first capacitive plate and the second capacitive plate; and
    force-sensing circuitry configured to detect changes in capacitive coupling between the first capacitive plate and the second capacitive plate due to compression of the compressible dielectric element, and to produce a signal that corresponds to a magnitude of a touch force on the touch sensor, wherein:
    the compressible dielectric element of the force-sensing structure is configured to compress in response to the touch force on the touch sensor;
    the force-sensing structure encircles an interior cavity of the electronic device;
    the first capacitive plate is positioned closer to the compressible dielectric element than the first layer of polyimide flex material, the second capacitive plate is positioned closer to the compressible dielectric element than the second layer of polyimide flex material, and the first layer of polyimide flex material is positioned between the cover glass and the first capacitive plate;
    a portion of the first capacitive plate extends outward from the first layer of polyimide flex material, towards the interior cavity, and a portion of the second capacitive plate extends outward from the second layer of polyimide flex material, towards the interior cavity; and
    the portions of the first capacitive plate and the second capacitive plate are operatively coupled to the force-sensing circuitry.

2. The electronic device of claim 1, wherein the force-sensing structure is a first force-sensing structure disposed along a first edge of the touch sensor, the electronic device further comprising:
    a second force-sensing structure disposed along a second edge of the touch sensor, the second force-sensing structure comprising:
        a third layer of polyimide flex material;
        a third capacitive plate;
        a fourth layer of polyimide flex material;
        a fourth capacitive plate; and
        a second compressible dielectric element disposed between the third capacitive plate and the fourth capacitive plate; wherein:
    the third capacitive plate is positioned closer to the second compressible dielectric element than the third layer of polyimide flex material, and the fourth capacitive plate is positioned closer to the second compressible dielectric element than the fourth layer of polyimide flex material; and
    the force-sensing circuitry operatively coupled to the first force-sensing structure and the second force-sensing structure and configured to detect changes in capacitive coupling due to deflection of the first force-sensing structure and the second force-sensing structure, wherein the force-sensing circuitry is further configured to produce the signal that corresponds to the magnitude of the touch force on the touch sensor.

3. The electronic device of claim 1, wherein the touch sensor is a capacitive touch sensor.

4. The electronic device of claim 1, further comprising:
    an enclosure having an opening and a bezel surrounding the opening; and
    a display element disposed within the enclosure, below the cover glass, and viewable through the opening of the enclosure.

5. A force-sensing structure, comprising:
    an upper body comprising a dielectric layer;
    an upper capacitive plate connected to the upper body;
    a lower body;
    a lower capacitive plate connected to the lower body;
    a deformable middle body connected to one of the upper body and the upper capacitive plate, the deformable middle body further connected to one of the lower body and the lower capacitive plate; and
    an electrical connector tail configured to electrically connect the force-sensing structure to a force-sensing circuit, wherein:
    each of the upper body, the upper capacitive plate, the lower body, the lower capacitive plate, and the deformable middle body defines a hole for positioning a display, wherein the force-sensing structure is disposed at a periphery of a cover glass and around the display, and between the cover glass and a ledge of a housing of an electronic device, with the dielectric layer oriented toward the cover glass;
    the lower body comprises a second dielectric layer; and
    the electrical connector tail comprises: a first circuit layer comprising a first flexible conductive layer electrically connected with the upper capacitive plate, a second circuit layer comprising a second flexible conductive layer electrically connected with the lower capacitive plate, and an end portion configured to be detachably connected to a circuit component.

6. The force-sensing structure of claim 5, wherein the deformable middle body is configured to deform in response to a force on the force-sensing structure.

7. The force-sensing structure of claim 5, further comprising the force-sensing circuit, wherein the upper capacitive plate and the lower capacitive plate are operatively coupled to the force-sensing circuit, and the force-sensing circuit is configured to detect changes in capacitive coupling between the upper capacitive plate and the lower capacitive plate due to deformation of the deformable middle body.

8. The force-sensing structure of claim 7, wherein the force-sensing circuit is further configured to produce a signal that corresponds to a magnitude of a force on the force-sensing structure.

9. An electronic device comprising:
a cover glass;
a touch sensor comprising one or more arrays of conductive lines integrated with the cover glass and configured to detect a location of a touch on the cover glass;
a display disposed below the cover glass;
a force-sensing structure disposed around the display, wherein the force-sensing structure comprises:
a first layer of polyimide flex material;
a first capacitive plate on the first layer of polyimide flex material;
a second layer of polyimide flex material;
a second capacitive plate disposed on the second layer of polyimide flex material;
a compressible element disposed between the first capacitive plate and the second capacitive plate; and
an electrical connector tail for electrically connecting the force-sensing structure to force-sensing circuitry, wherein:
each of the first layer, the first capacitive plate, the second layer, the second capacitive plate, and the compressible element defines a hole in which the display is positioned;
the first capacitive plate is positioned closer to the compressible element than the first layer of polyimide flex material, the second capacitive plate is positioned closer to the compressible element than the second layer of polyimide flex material, and the first layer of polyimide flex material is positioned between the cover glass and the first capacitive plate; and
the electrical connector tail comprises a first circuit layer comprising a first flexible conductive layer electrically connected with the first capacitive plate, a second circuit layer comprising a second flexible conductive layer electrically connected with the second capacitive plate, and an end portion configured to be detachably connected to a circuit component, wherein the end portion includes a void region between the first circuit layer and the second circuit layer.

10. The electronic device of claim 9, wherein the compressible element of the force-sensing structure is configured to compress in response to a touch force on the touch sensor.

11. The electronic device of claim 9, wherein:
the first capacitive plate and the second capacitive plate are operatively coupled to the force-sensing circuitry;
the force-sensing circuitry is configured to detect changes in capacitive coupling between the first capacitive plate and the second capacitive plate due to compression of the compressible element; and
the force-sensing circuitry is further configured to produce a signal that corresponds to a magnitude of a touch force on the touch sensor.

12. The electronic device of claim 9, wherein the force-sensing structure is a first force-sensing structure disposed along a first edge of a periphery of the touch sensor, the electronic device further comprising:
a second force-sensing structure disposed along a second edge of the periphery of the touch sensor, the second force-sensing structure comprising:
a third layer of polyimide flex material;
a third capacitive plate;
a fourth layer of polyimide flex material;
a fourth capacitive plate; and
a second compressible element disposed between the third capacitive plate and the fourth capacitive plate; wherein:
the third capacitive plate is positioned closer to the second compressible element than the third layer of polyimide flex material, and the fourth capacitive plate is positioned closer to the second compressible element than the fourth layer of polyimide flex material;
the force-sensing circuitry is operatively coupled to the first force-sensing structure and the second force-sensing structure and configured to detect changes in capacitive coupling due to deflection of the first force-sensing structure and the second force-sensing structure; and
the force-sensing circuitry is further configured to produce a signal that corresponds to a magnitude of a touch force on the touch sensor.

13. The electronic device of claim 9, wherein the touch sensor is a capacitive touch sensor.

14. The electronic device of claim 9, further comprising:
an enclosure having an opening and a bezel surrounding the opening; and
a display element disposed within the enclosure, below the cover glass, and viewable through the opening of the enclosure.

15. The electronic device of claim 9, wherein the force-sensing structure is a first force-sensing structure disposed along a first edge of a periphery of the touch sensor, the electronic device further comprising:
a second force-sensing structure disposed along a second edge of the periphery of the touch sensor, the second force-sensing structure comprising:
a third layer of polyimide flex material;
a third capacitive plate;
a fourth layer of polyimide flex material;
a fourth capacitive plate; and
a second compressible element disposed between the third capacitive plate and the fourth capacitive plate; wherein
the third capacitive plate is positioned closer to the second compressible element than the third layer of polyimide flex material, and the fourth capacitive plate is positioned closer to the second compressible element than the fourth layer of polyimide flex material; and
the electrical connector tail further comprises:
a third circuit layer comprising a third flexible conductive layer electrically connected with the third capacitive plate, a fourth circuit layer comprising t a fourth flexible conductive layer electrically connected with the fourth capacitive plate, wherein the void region is further between the third circuit layer and the fourth circuit layer.

* * * * *